United States Patent
Inomoto

(10) Patent No.: US 9,715,092 B2
(45) Date of Patent: Jul. 25, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/170,432

(22) Filed: Jun. 1, 2016

(65) Prior Publication Data

US 2016/0356997 A1   Dec. 8, 2016

(30) Foreign Application Priority Data

Jun. 5, 2015   (JP) ................. 2015-114801
Jun. 5, 2015   (JP) ................. 2015-114802

(51) Int. Cl.
| | |
|---|---|
| *G02B 15/14* | (2006.01) |
| *G02B 15/177* | (2006.01) |
| *G02B 13/16* | (2006.01) |
| *H04N 5/232* | (2006.01) |
| *G02B 13/06* | (2006.01) |
| *G02B 13/18* | (2006.01) |

(52) U.S. Cl.
CPC ........... *G02B 15/177* (2013.01); *G02B 13/06* (2013.01); *G02B 13/16* (2013.01); *H04N 5/23238* (2013.01); *G02B 13/18* (2013.01)

(58) Field of Classification Search
CPC ...... G02F 1/01; G02F 1/3544; G02F 2203/50; H04B 10/548; G02B 13/009; G02B 15/14; G02B 15/16; G02B 15/177; G02B 15/20

USPC ................. 359/676, 683, 686, 689
See application file for complete search history.

(56) References Cited

U.S. PATENT DOCUMENTS 5,724,193 A    3/1998  Hirakawa
5,877,901 A *  3/1999  Enomoto ............... G02B 13/06
                                                          359/681

(Continued)

FOREIGN PATENT DOCUMENTS

EP    2407809 A1    1/2012
JP    2007-140359 A  6/2007

(Continued)

OTHER PUBLICATIONS

Search Report for corresponding European Application No. 16172808.4 dated Oct. 7, 2016.

*Primary Examiner* — William Choi
(74) *Attorney, Agent, or Firm* — Carter, Deluca, Farrell & Schmidt, LLP

(57) ABSTRACT

A zoom lens includes: a first lens unit having a negative refractive power; and a rear group having a positive refractive power, in which, when a focal length of the zoom lens is a shortest focal length, a maximum image height is lower than a half of a diagonal length of an image pickup region, and when a focal length of the zoom lens at which the maximum image height becomes a half of the diagonal length of the image pickup region is defined as an intermediate focal length, a focal length of the zoom lens at a longest focal length, a half angle of field of the zoom lens at the longest focal length, and other such factors are appropriately set so that the maximum image height is increased continuously from the shortest focal length to the intermediate focal length.

14 Claims, 22 Drawing Sheets

(56) References Cited

U.S. PATENT DOCUMENTS

| | | |
|---|---|---|
| 9,264,638 B2 | 2/2016 | Nakamura et al. |
| 9,268,120 B2 | 2/2016 | Shimomura et al. |
| 9,291,800 B2 | 3/2016 | Inomoto et al. |
| 9,310,592 B2 | 4/2016 | Wakazono et al. |
| 2007/0047096 A1 | 3/2007 | Ito et al. |
| 2012/0013997 A1 | 1/2012 | Yamanaka |

FOREIGN PATENT DOCUMENTS

| | | |
|---|---|---|
| JP | 2007-233045 A | 9/2007 |
| JP | 2011-095488 A | 5/2011 |
| JP | 2012-022109 A | 2/2012 |
| JP | 2012-194238 A | 10/2012 |
| JP | 2014-137483 A | 7/2014 |
| JP | 2014-178388 A | 9/2014 |

\* cited by examiner

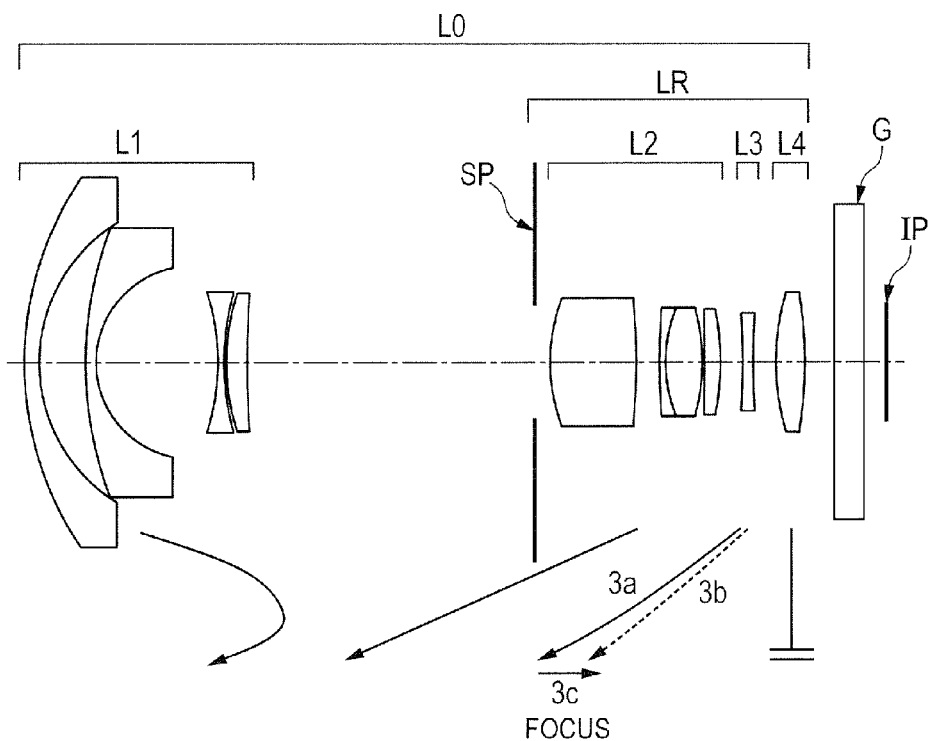
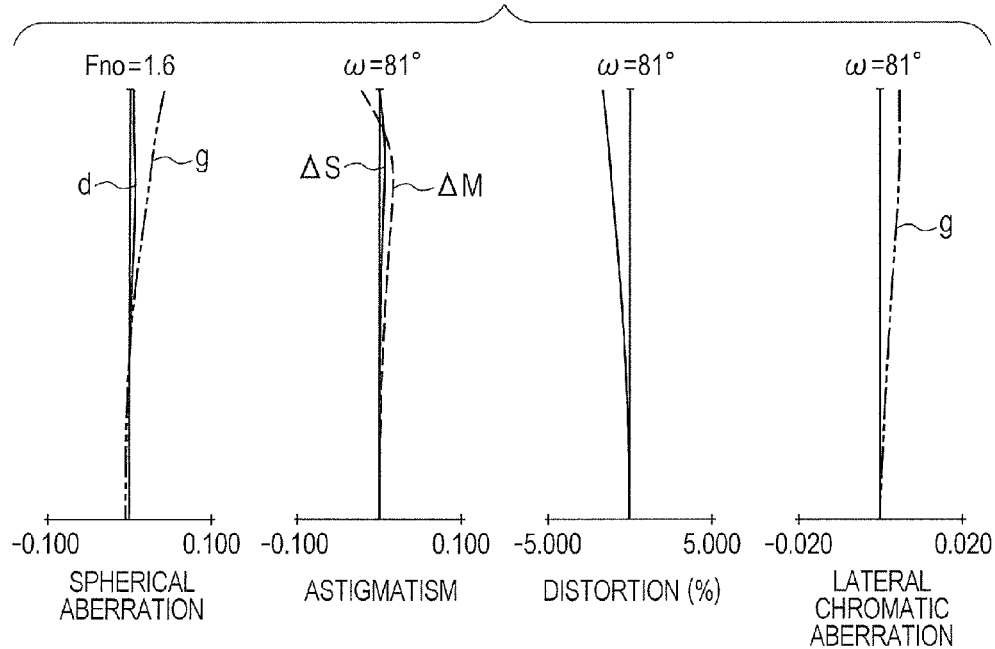

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup optical system used for an image pickup apparatus using an image pickup element, such as a digital still camera, a video camera, a surveillance camera, an on-vehicle camera, or a broadcasting camera.

Description of the Related Art

In recent years, as an image pickup optical system used for a surveillance camera, an on-vehicle camera, or the like, a fisheye zoom lens having a wide angle of field, which facilitates image capturing with small dead angle, is required. The fisheye zoom lens is primarily intended to secure a wide angle of field by allowing a distortion. For example, there is known a type in which an image circle diameter is set with respect to a diagonal direction of an image pickup element at a lens image forming position, and in which a total angle of field ($2\omega$) of the image pickup element is about 180 degrees diagonally (hereinafter referred to as "full-frame fisheye type").

Meanwhile, there is also known a type in which a total angle of field in a short side direction of the image pickup element is about 180 degrees, and in which a substantially circular image is formed on the image pickup element of an image pickup apparatus to secure the angle of field of about 180 degrees circumferentially, which includes diagonally, horizontally, and vertically (hereinafter referred to as "circular fisheye type").

In Japanese Patent Application Laid-Open No. 2012-22109, there is described a zoom lens capable of switching between the full-frame fisheye type and the circular fisheye type depending on a magnification-varying state. In Japanese Patent Application Laid-Open No. 2012-194238, there is disclosed a fisheye zoom lens, which has a half angle of field of about 90 degrees at a shortest focal length (wide angle end), and is capable of zooming to a standard angle of field at a telephoto end.

The circular fisheye type has problems in that not all pixels of the image pickup element are effectively used, and in that a magnification is reduced to result in insufficient ability to discern a subject. Therefore, for an image pickup apparatus such as the surveillance camera or the on-vehicle camera, a zoom lens having good optical performance over the entire range from a range including the circular fisheye type and the full-frame fisheye type to a longest focal length, at which the standard angle of field is obtained, is sought for.

In order to satisfy those requirements, it is important to appropriately set a shape and a size of an image pickup region of the image pickup element, a change in angle of field and a change in maximum image height accompanying zooming of the zoom lens, and other such factors with respect to the image pickup region of the image pickup element.

SUMMARY OF THE INVENTION

According to one embodiment of the present invention, there is provided a zoom lens, which is configured to form a subject image on an image pickup element, including, in order from an object side to an image side:
 a first lens unit having a negative refractive power; and
 a rear group including a plurality of lens units,
 in which the rear group includes a lens unit having a positive refractive power,
 in which an interval between each pair of adjacent lens units is changed during zooming from a shortest focal length to a longest focal length,
 in which the image pickup element has a rectangular image pickup region, and when a focal length of an entire system of the zoom lens is the shortest focal length, a maximum image height is lower than a half of a diagonal length of the rectangular image pickup region, and there are regions in which the subject image is not formed in the image pickup region,
 in which, when a focal length of the zoom lens at which the maximum image height becomes a half of the diagonal length of the image pickup region is defined as a first intermediate focal length, the maximum image height is increased continuously from the shortest focal length to the first intermediate focal length, and
 in which the following conditional expressions are satisfied:

$$0.75 < D/(ft \times \tan(\omega t)) < 1.10; \text{ and}$$

$$1.4 < D/Yw < 2.6,$$

where ft represents a focal length of the entire system of the zoom lens at the longest focal length, $\omega t$ represents a half angle of field of the entire system of the zoom lens at the longest focal length, Yw represents an image height at the shortest focal length, and D represents a length that is a half of the diagonal length of the image pickup element.

Further features of the present invention will become apparent from the following description of exemplary embodiments with reference to the attached drawings.

BRIEF DESCRIPTION OF THE DRAWINGS

FIG. 5 is a lens cross-sectional view of Embodiment 3 of the present invention at a shortest focal length.

FIG. 6A is aberration diagrams of Embodiment 3 at the shortest focal length.

DESCRIPTION OF THE EMBODIMENTS

Now, exemplary embodiments of the present invention are described in detail with reference to the attached drawings. The present invention relates to a zoom lens configured to form a subject image on an image pickup element. The image pickup element has a rectangular image pickup region. The zoom lens consists, in order from an object side to an image side, of a first lens unit having a negative refractive power, and a rear group including a plurality of lens units which include a lens unit having a positive refractive power, and an interval between each pair of adjacent lens units is changed during zooming.

Figure 1:
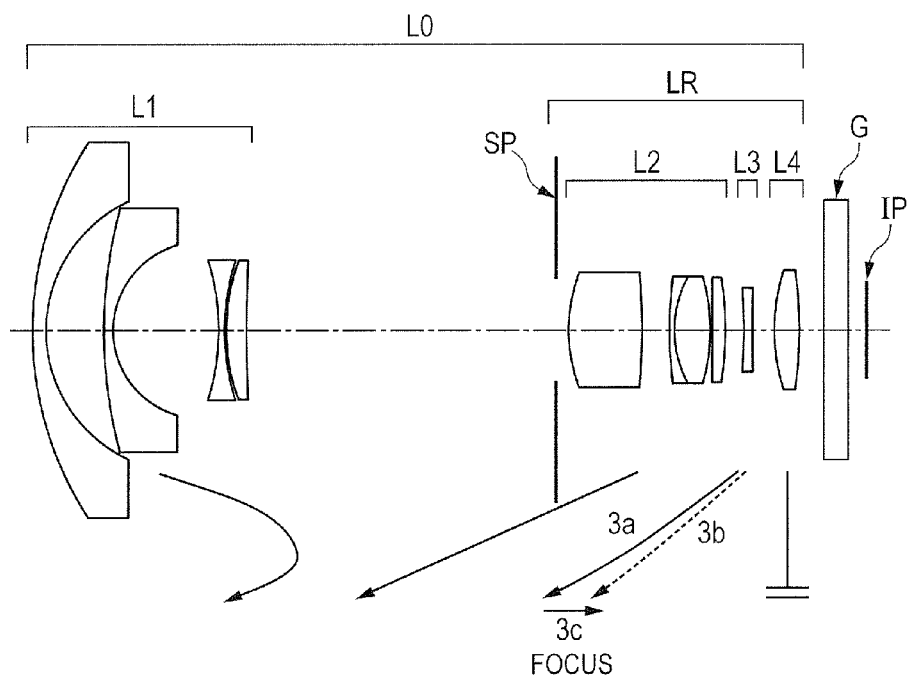
FIG. 1 is a lens cross-sectional view of Embodiment 1 of the present invention at a shortest focal length.
Figure 2A:
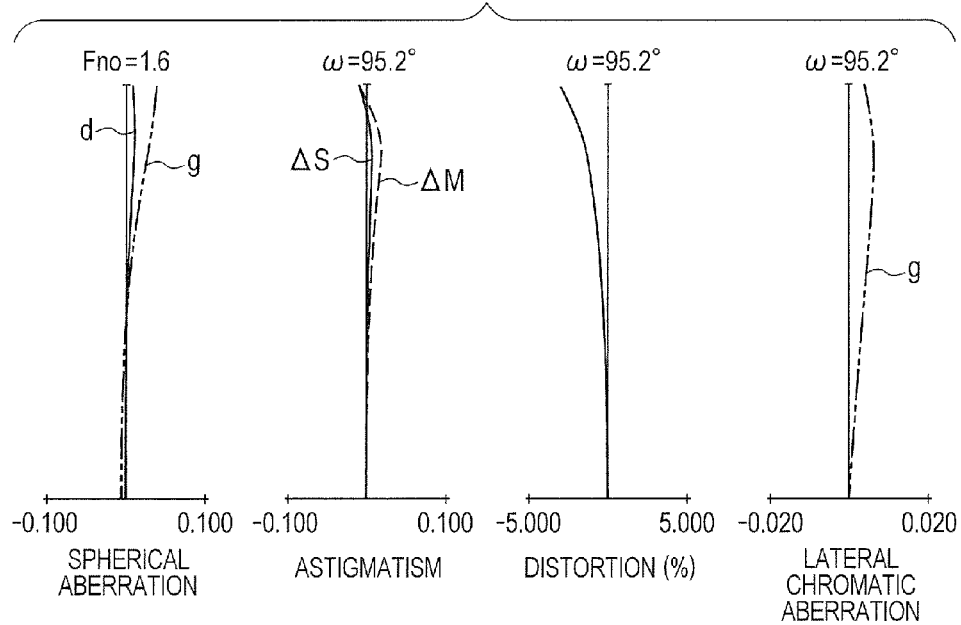
FIG. 2A is aberration diagrams of Embodiment 1 at the shortest focal length.
Figure 2B:
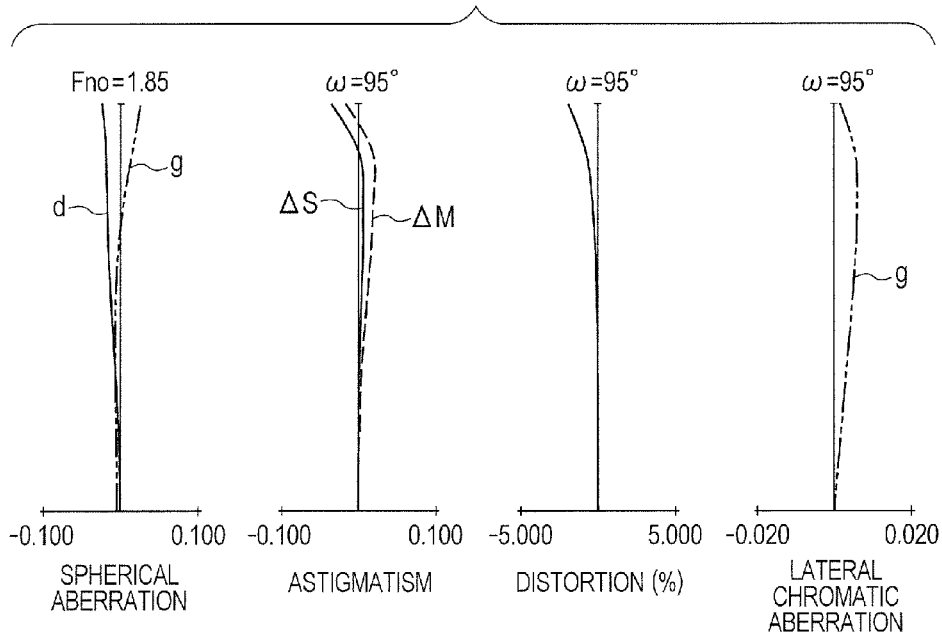
FIG. 2B is aberration diagrams of Embodiment 1 at an intermediate focal length.
Figure 2C:
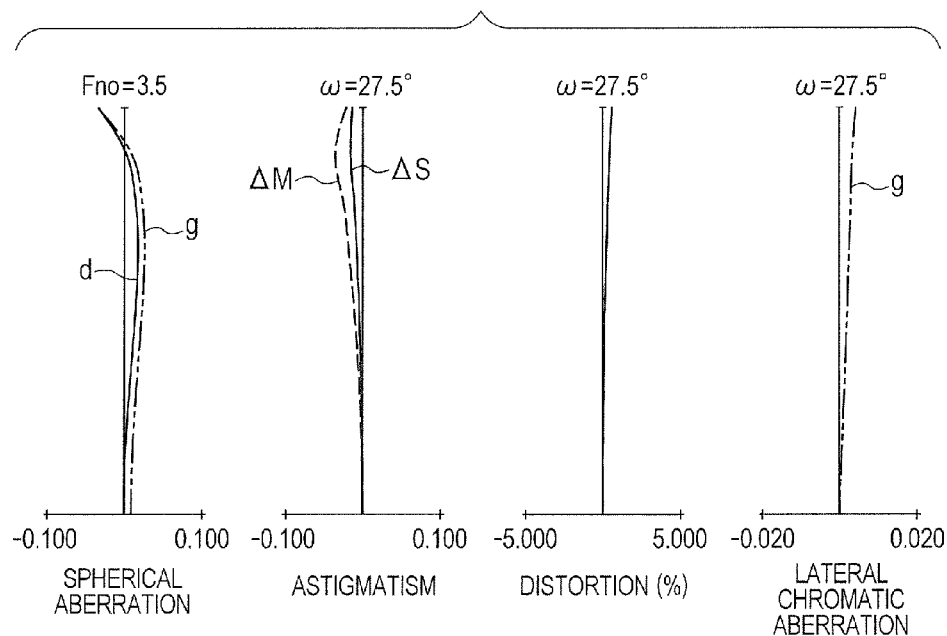
FIG. 2C is aberration diagrams of Embodiment 1 at a longest focal length.

FIG. 1 is a lens cross-sectional view of a zoom lens according to Embodiment 1 of the present invention at a shortest focal length. FIG. 2A, FIG. 2B, and FIG. 2C are aberration diagrams of the zoom lens according to Embodiment 1 at the shortest focal length, an intermediate focal length, and a longest focal length, respectively. Embodiment 1 relates to a zoom lens having a zoom ratio of 5.00 and an F-number of from 1.60 to 3.50.

Figure 3:
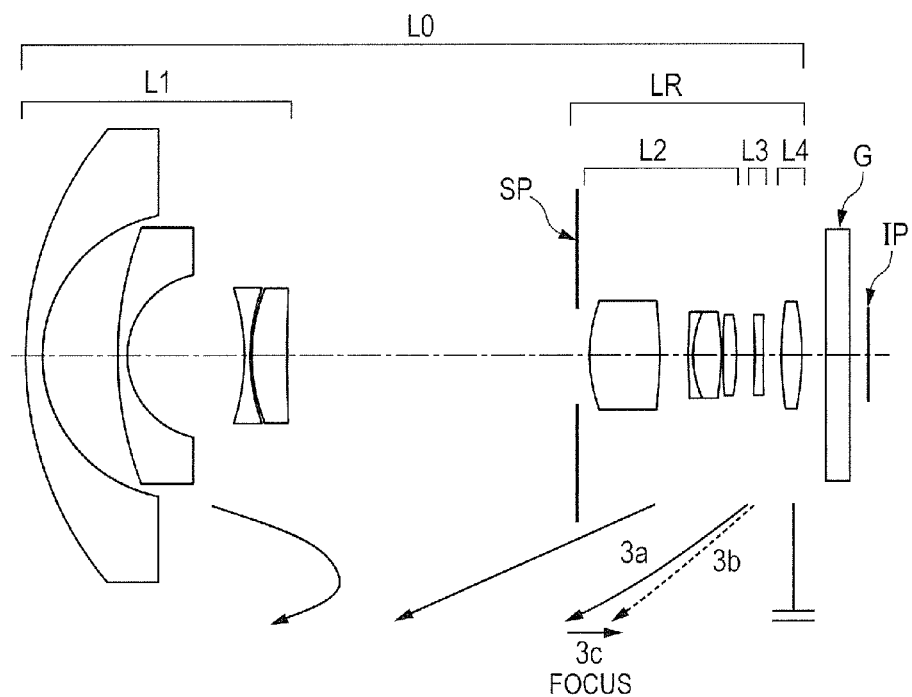
FIG. 3 is a lens cross-sectional view of Embodiment 2 of the present invention at a shortest focal length.
Figure 4A:
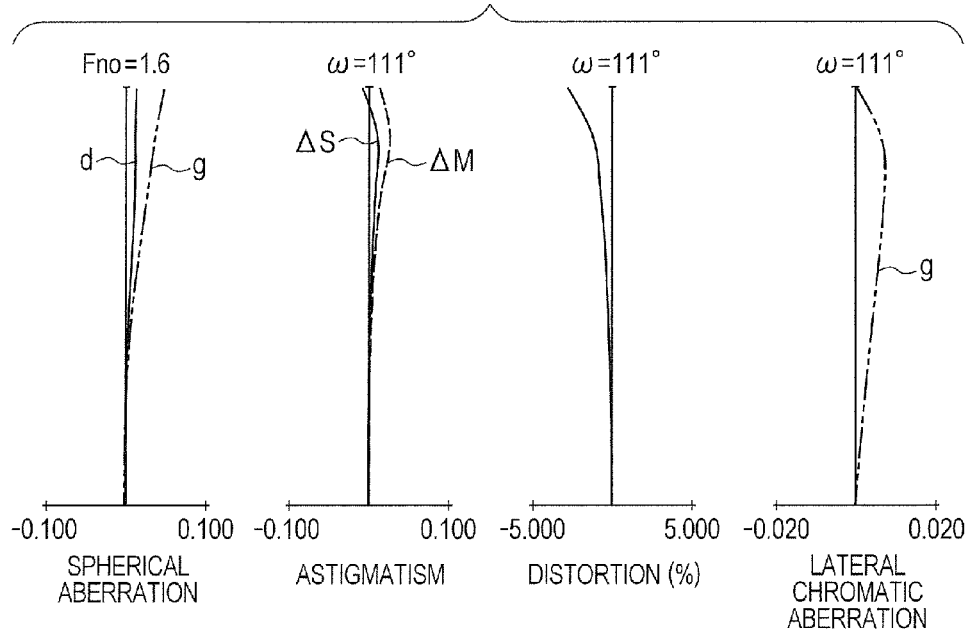
FIG. 4A is aberration diagrams of Embodiment 2 at the shortest focal length.
Figure 4B:
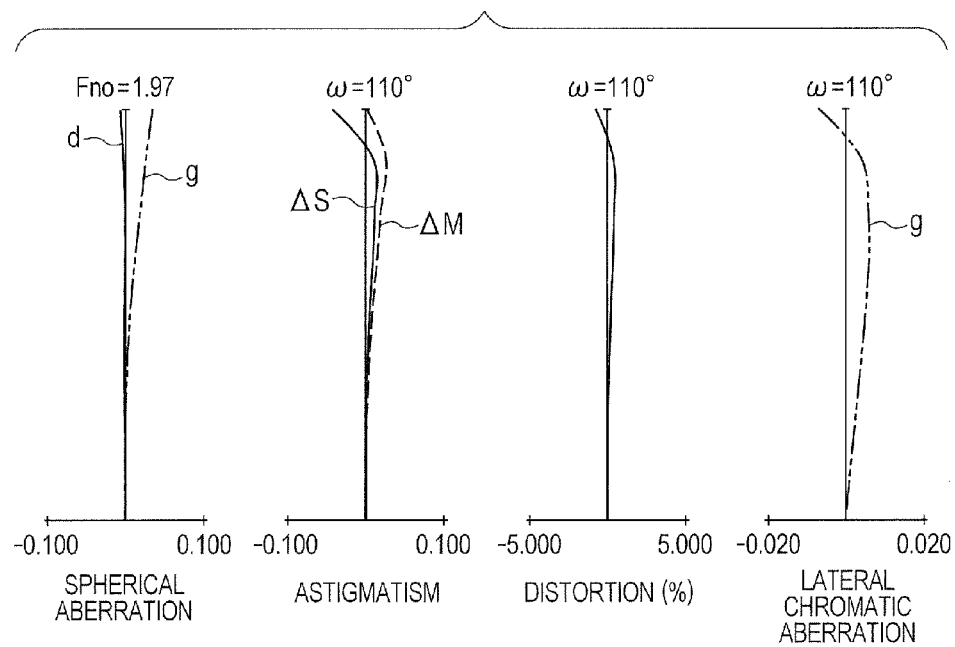
FIG. 4B is aberration diagrams of Embodiment 2 at an intermediate focal length.
Figure 4C:
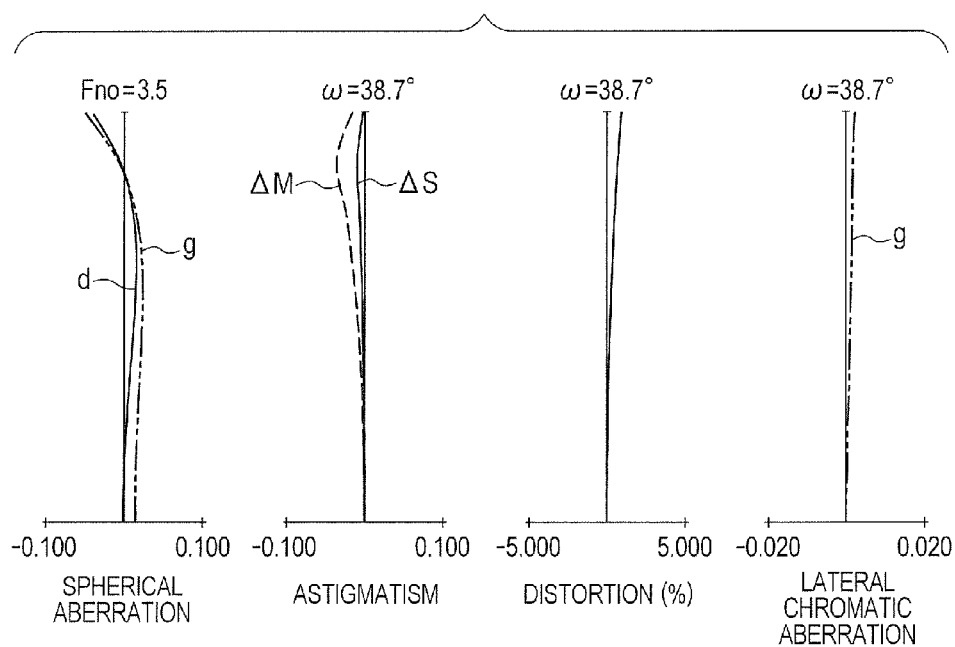
FIG. 4C is aberration diagrams of Embodiment 2 at a longest focal length.

FIG. 3 is a lens cross-sectional view of a zoom lens according to Embodiment 2 of the present invention at a shortest focal length. FIG. 4A, FIG. 4B, and FIG. 4C are aberration diagrams of the zoom lens according to Embodiment 2 at the shortest focal length, an intermediate focal length, and a longest focal length, respectively. Embodiment 2 relates to a zoom lens having a zoom ratio of 4.00 and an F-number of from 1.60 to 3.50.

Figure 6B:
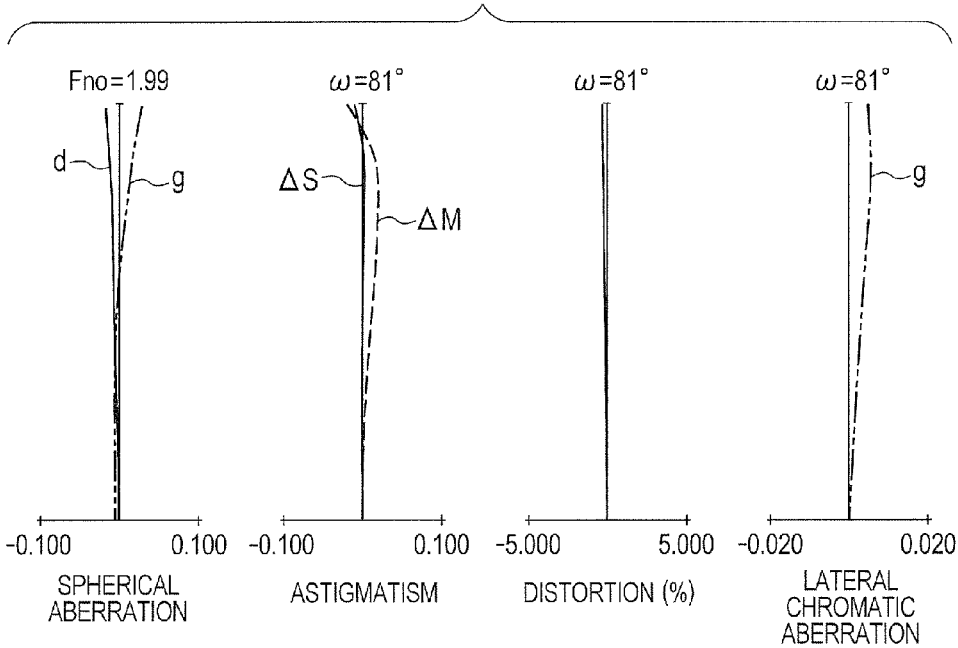
FIG. 6B is aberration diagrams of Embodiment 3 at an intermediate focal length.
Figure 6C:
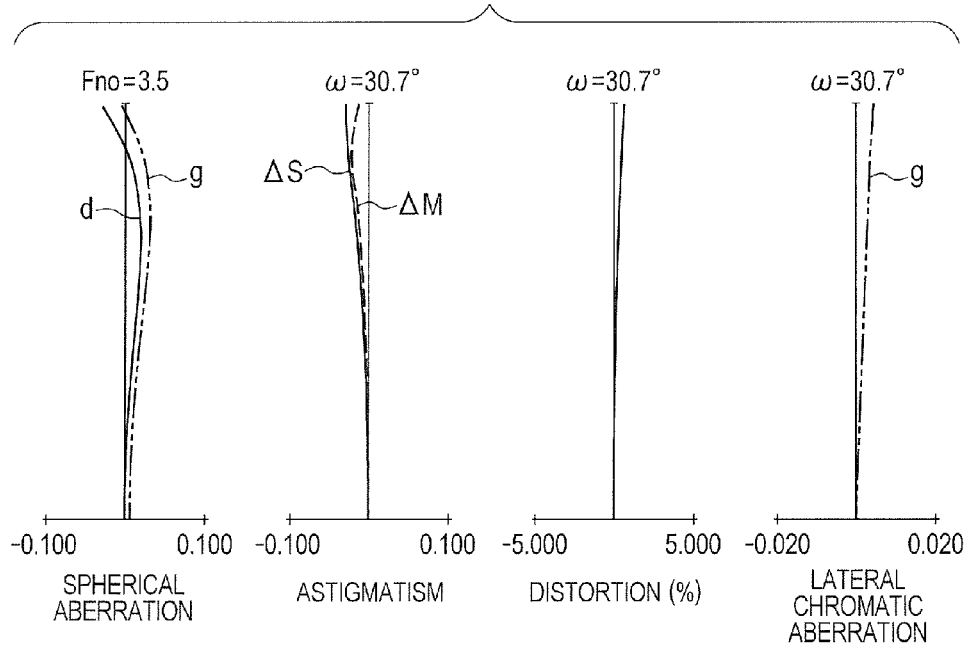
FIG. 6C is aberration diagrams of Embodiment 3 at a longest focal length.

FIG. 5 is a lens cross-sectional view of a zoom lens according to Embodiment 3 of the present invention at a shortest focal length. FIG. 6A, FIG. 6B, and FIG. 6C are aberration diagrams of the zoom lens according to Embodiment 3 at the shortest focal length, an intermediate focal length, and a longest focal length, respectively. Embodiment 3 relates to a zoom lens having a zoom ratio of 4.00 and an F-number of from 1.60 to 3.50.

Figure 7:
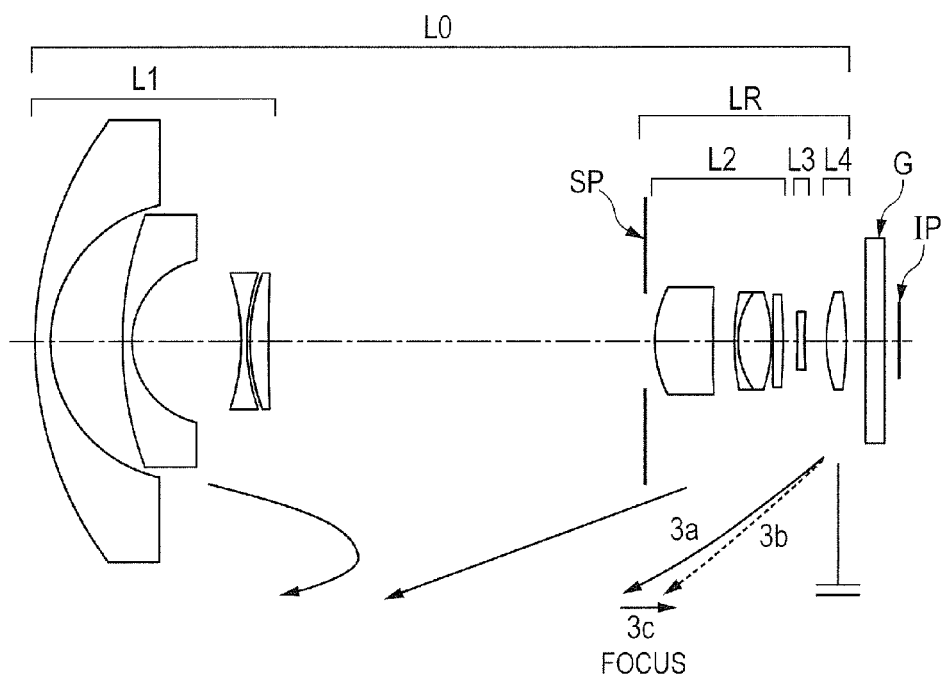
FIG. 7 is a lens cross-sectional view of Embodiment 4 of the present invention at a shortest focal length.
Figure 8A:
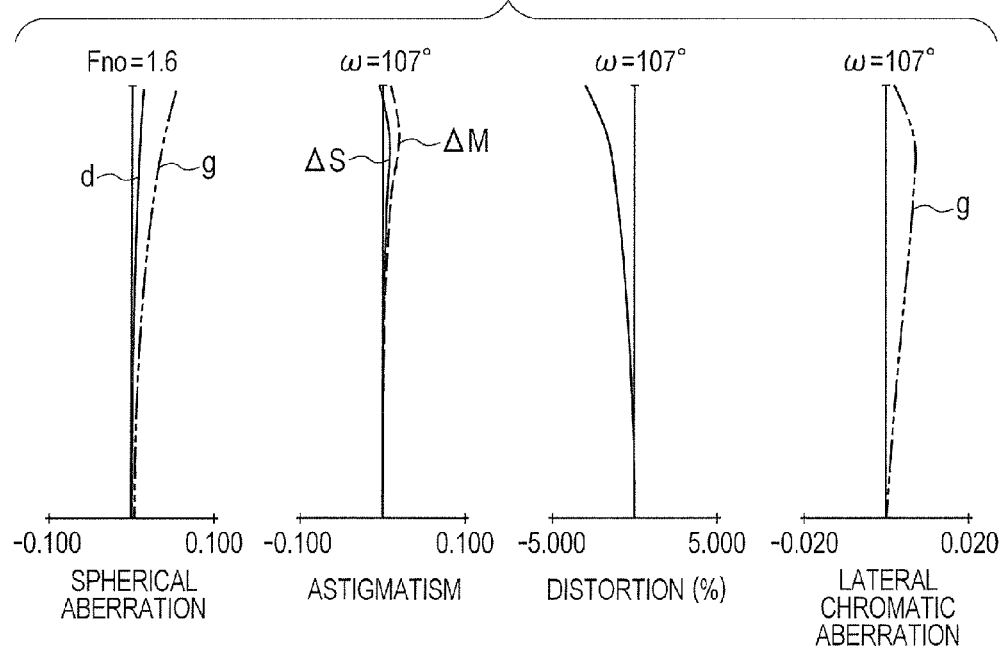
FIG. 8A is aberration diagrams of Embodiment 4 at the shortest focal length.
Figure 8B:
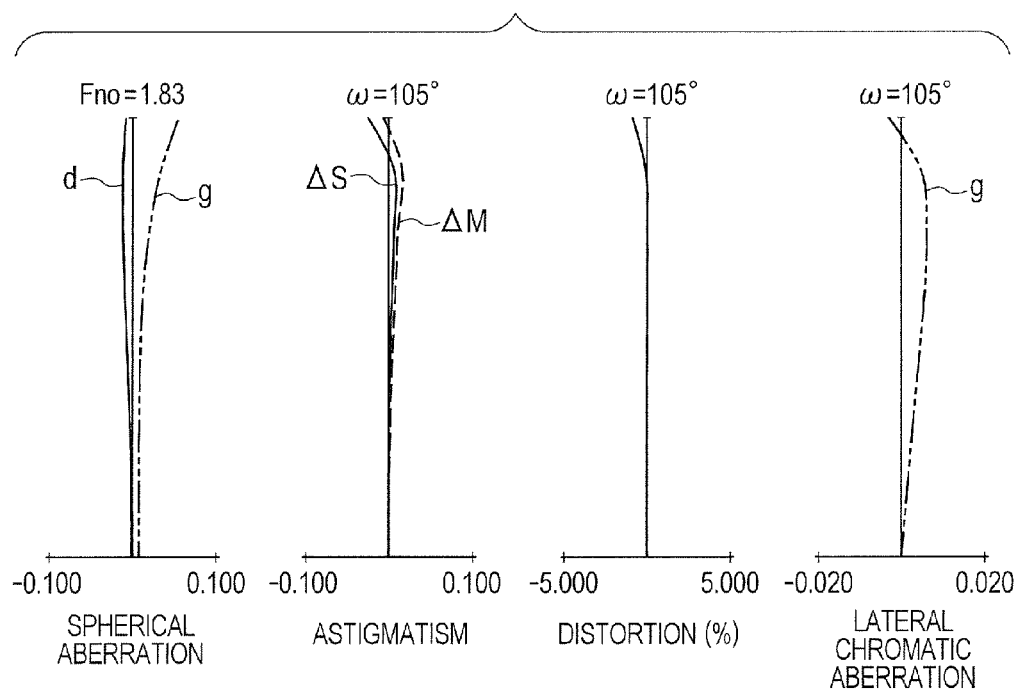
FIG. 8B is aberration diagrams of Embodiment 4 at an intermediate focal length.
Figure 8C:
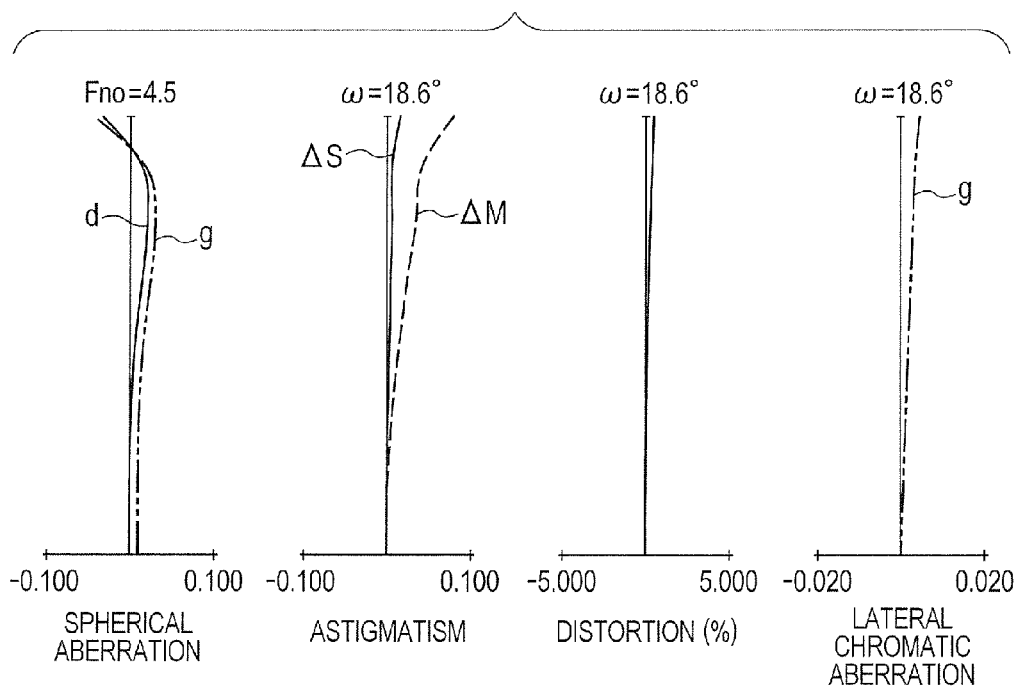
FIG. 8C is aberration diagrams of Embodiment 4 at a longest focal length.

FIG. 7 is a lens cross-sectional view of a zoom lens according to Embodiment 4 of the present invention at a shortest focal length. FIG. 8A, FIG. 8B, and FIG. 8C are aberration diagrams of the zoom lens according to Embodiment 4 at the shortest focal length, an intermediate focal length, and a longest focal length, respectively. Embodiment 4 relates to a zoom lens having a zoom ratio of 8.00 and an F-number of from 1.60 to 4.50.

Figure 9:
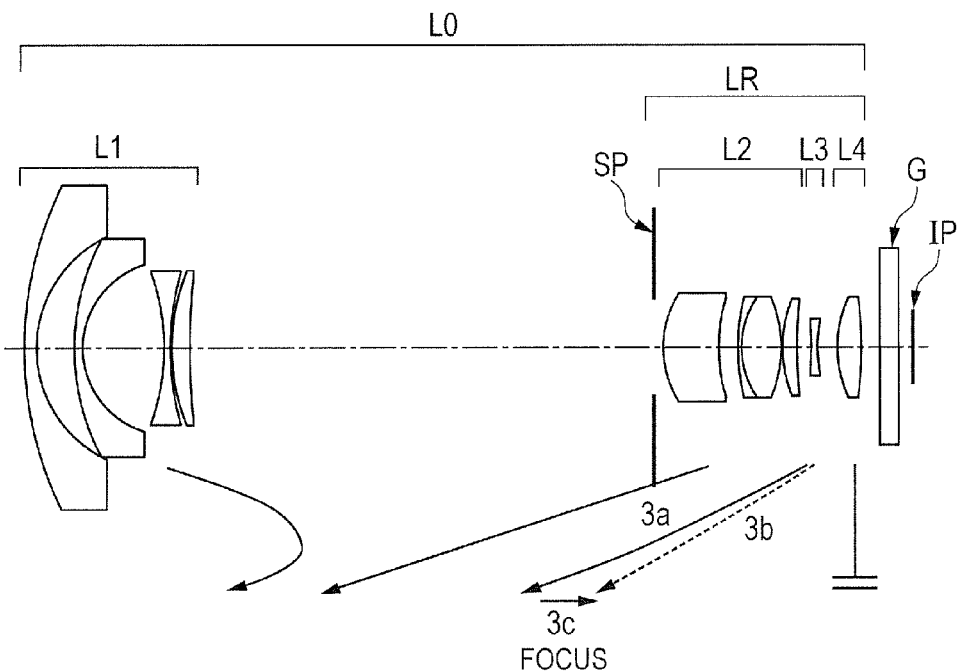
FIG. 9 is a lens cross-sectional view of Embodiment 5 of the present invention at a shortest focal length.
Figure 10A:
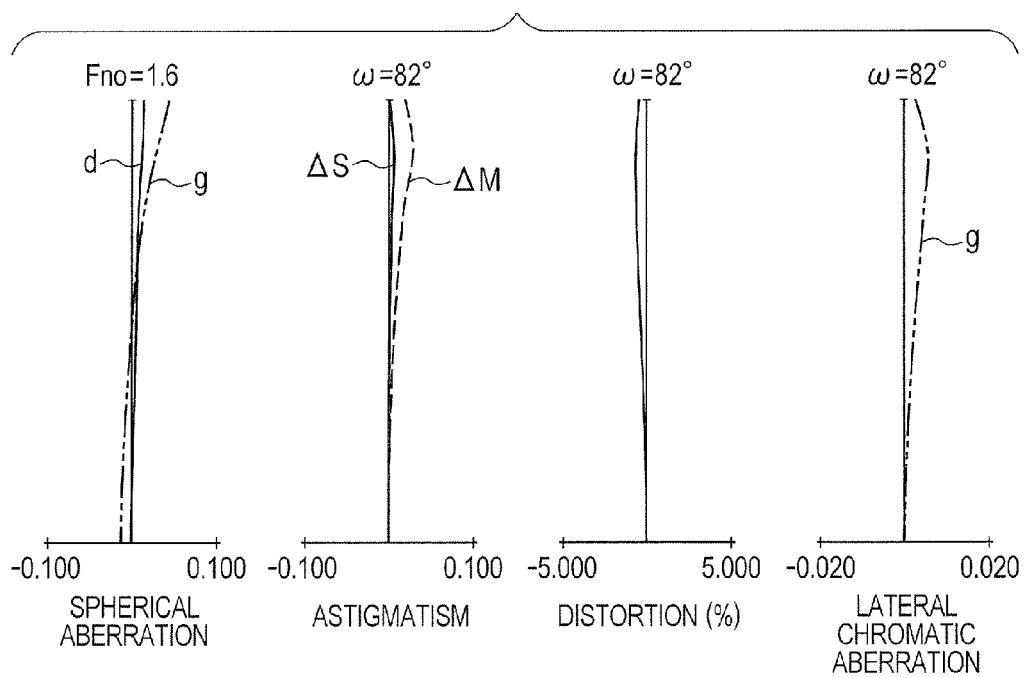
FIG. 10A is aberration diagrams of Embodiment 5 at the shortest focal length.
Figure 10B:
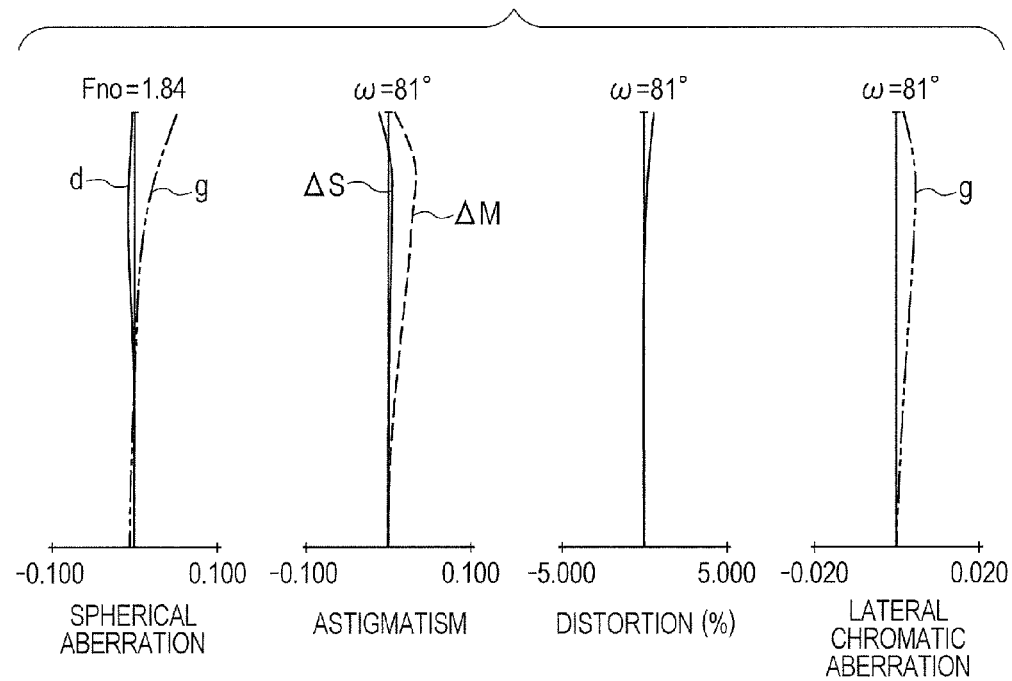
FIG. 10B is aberration diagrams of Embodiment 5 at an intermediate focal length.
Figure 10C:
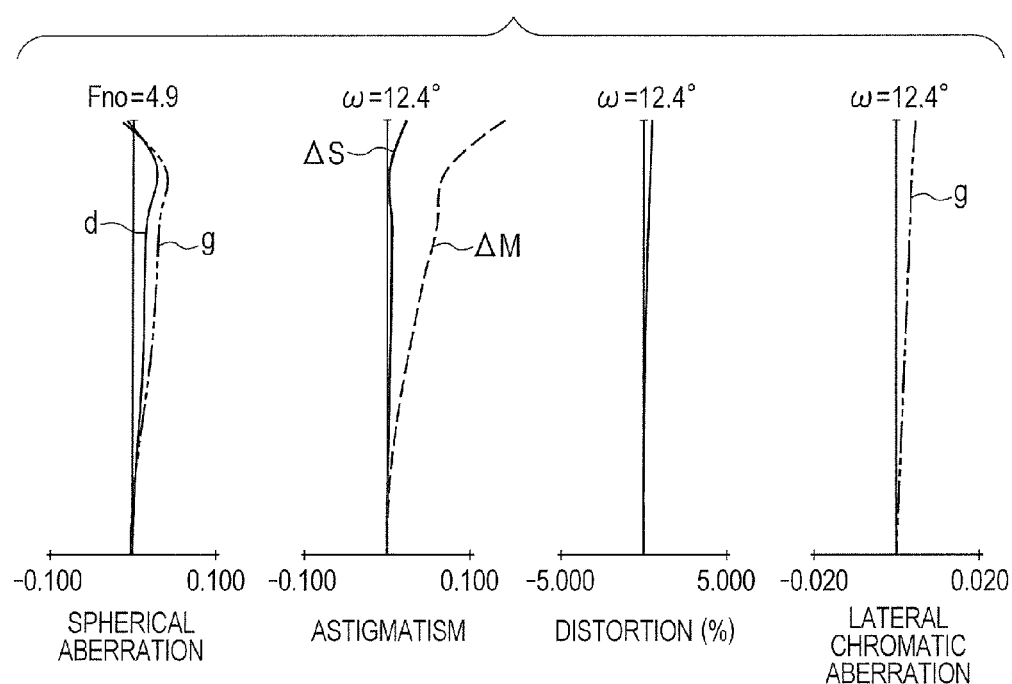
FIG. 10C is aberration diagrams of Embodiment 5 at a longest focal length.

FIG. 9 is a lens cross-sectional view of a zoom lens according to Embodiment 5 of the present invention at a shortest focal length. FIG. 10A, FIG. 10B, and FIG. 10C are aberration diagrams of the zoom lens according to Embodiment 5 at the shortest focal length, an intermediate focal length, and a longest focal length, respectively. Embodiment 5 relates to a zoom lens having a zoom ratio of 10.00 and an F-number of from 1.60 to 4.90.

Figure 11:
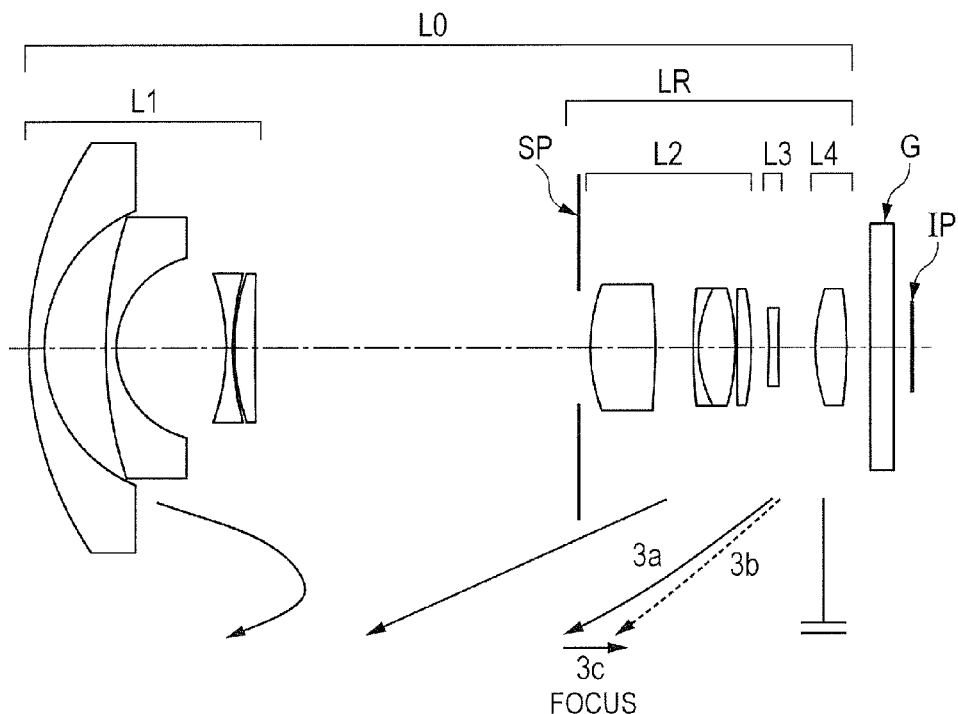
FIG. 11 is a lens cross-sectional view of Embodiment 6 of the present invention at a shortest focal length.
Figure 12A:
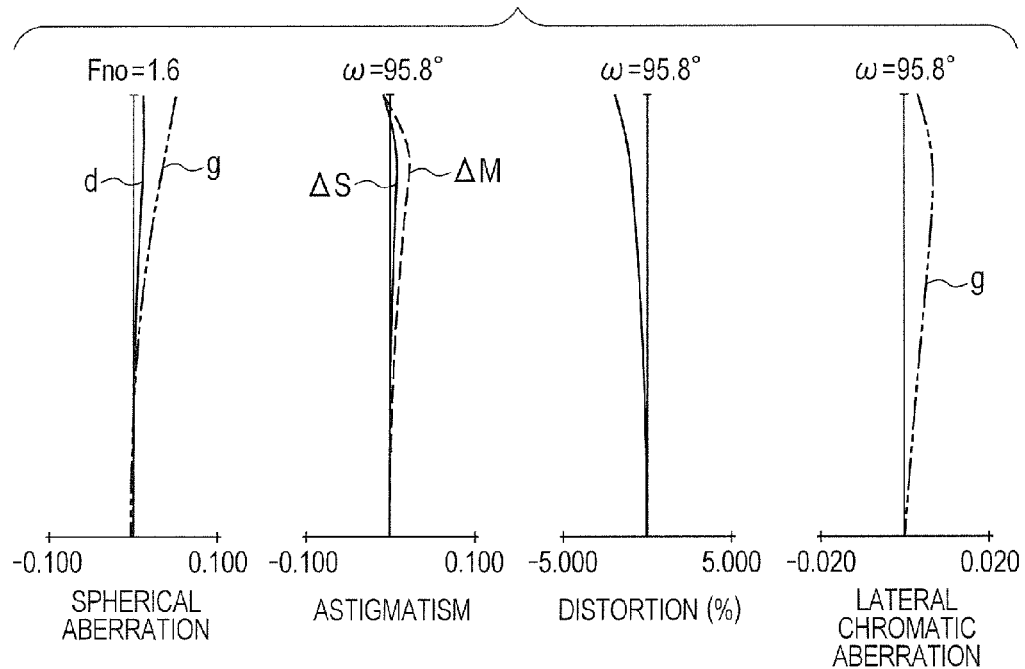
FIG. 12A is aberration diagrams of Embodiment 6 at the shortest focal length.
Figure 12B:
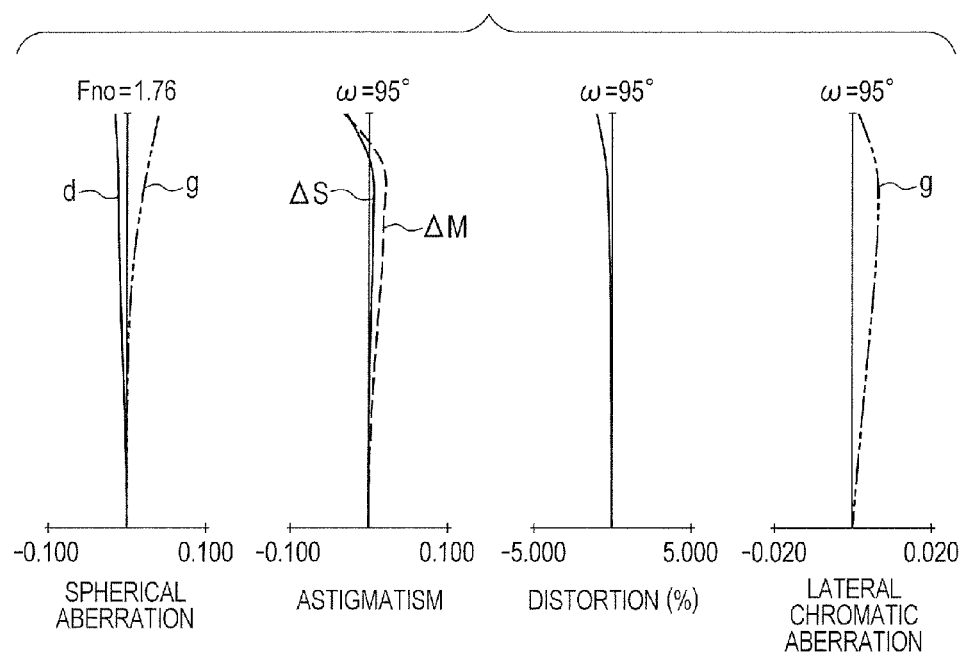
FIG. 12B is aberration diagrams of Embodiment 6 at an intermediate focal length.
Figure 12C:
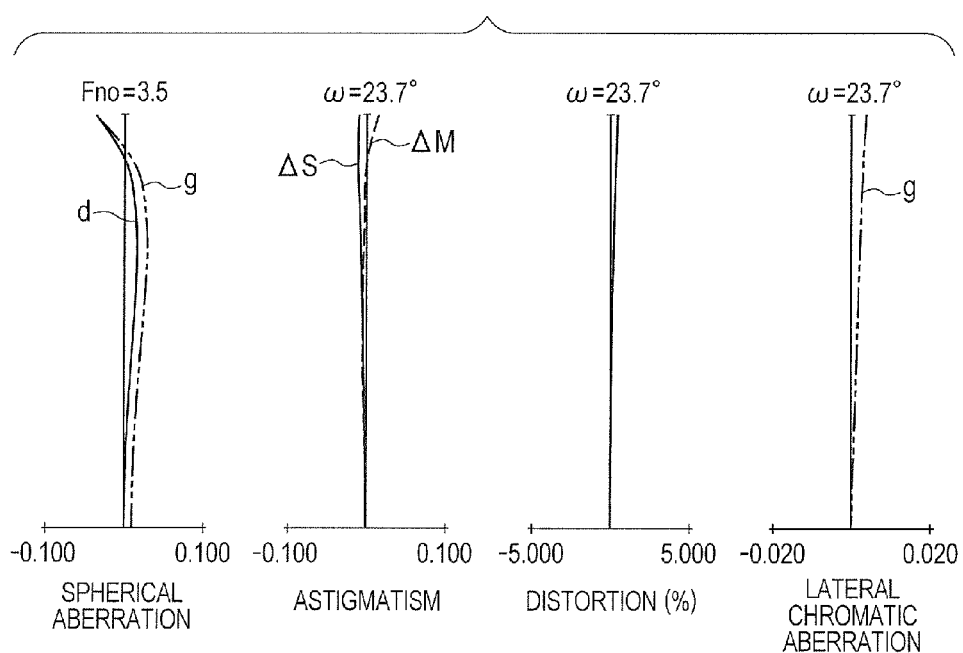
FIG. 12C is aberration diagrams of Embodiment 6 at a longest focal length.

FIG. 11 is a lens cross-sectional view of a zoom lens according to Embodiment 6 of the present invention at a shortest focal length. FIG. 12A, FIG. 12B, and FIG. 12C are aberration diagrams of the zoom lens according to Embodiment 6 at the shortest focal length, an intermediate focal length, and a longest focal length, respectively. Embodiment 6 relates to a zoom lens having a zoom ratio of 5.00 and an F-number of from 1.60 to 3.50.

Figure 13:
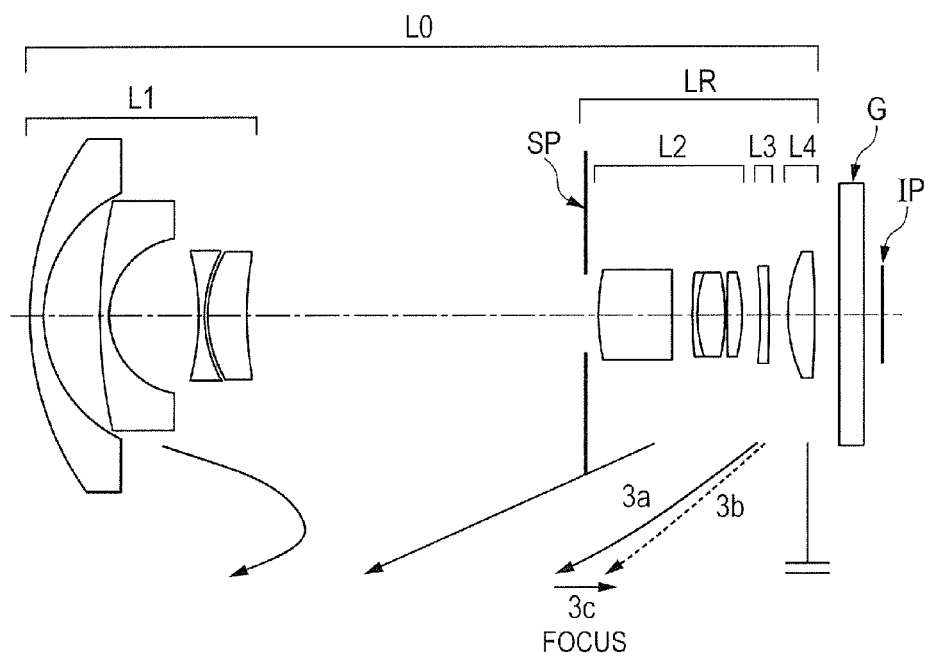
FIG. 13 is a lens cross-sectional view of Embodiment 7 of the present invention at a shortest focal length.
Figure 14A:
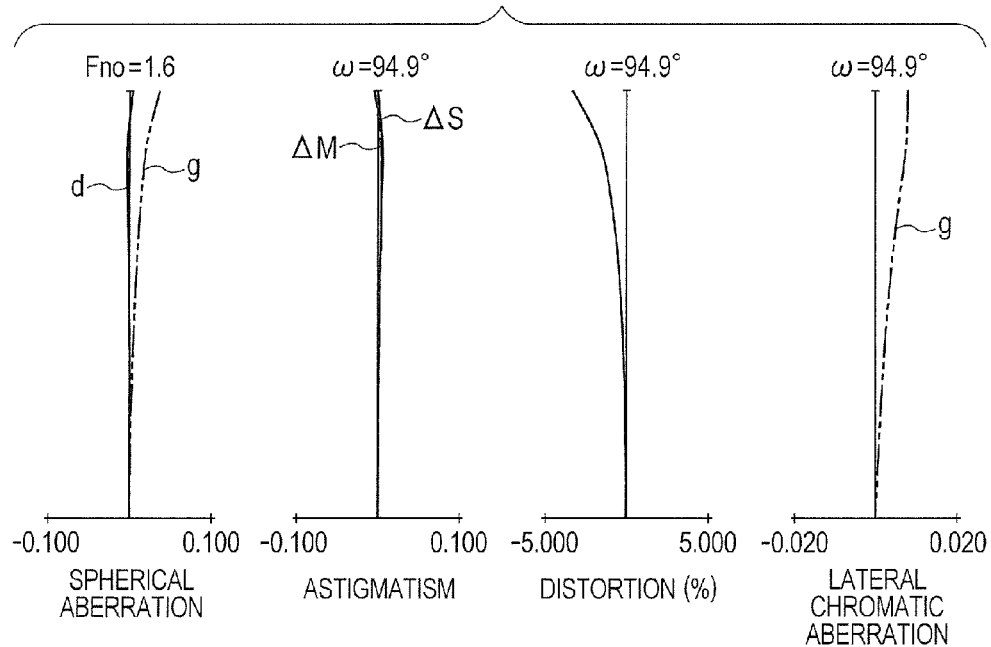
FIG. 14A is aberration diagrams of Embodiment 7 at the shortest focal length.
Figure 14B:
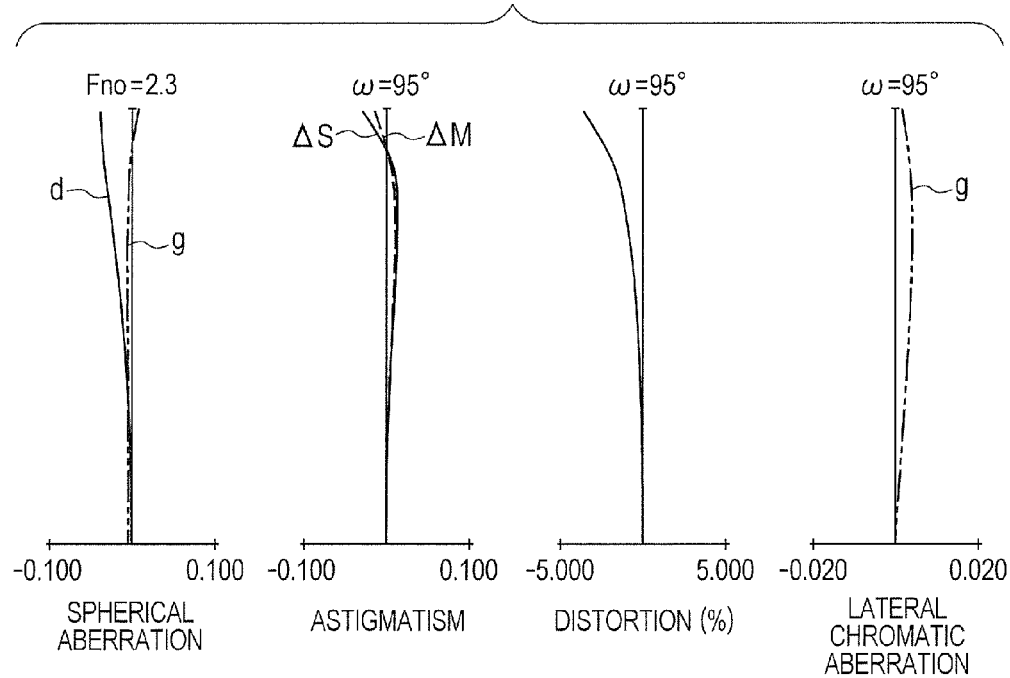
FIG. 14B is aberration diagrams of Embodiment 7 at an intermediate focal length.
Figure 14C:
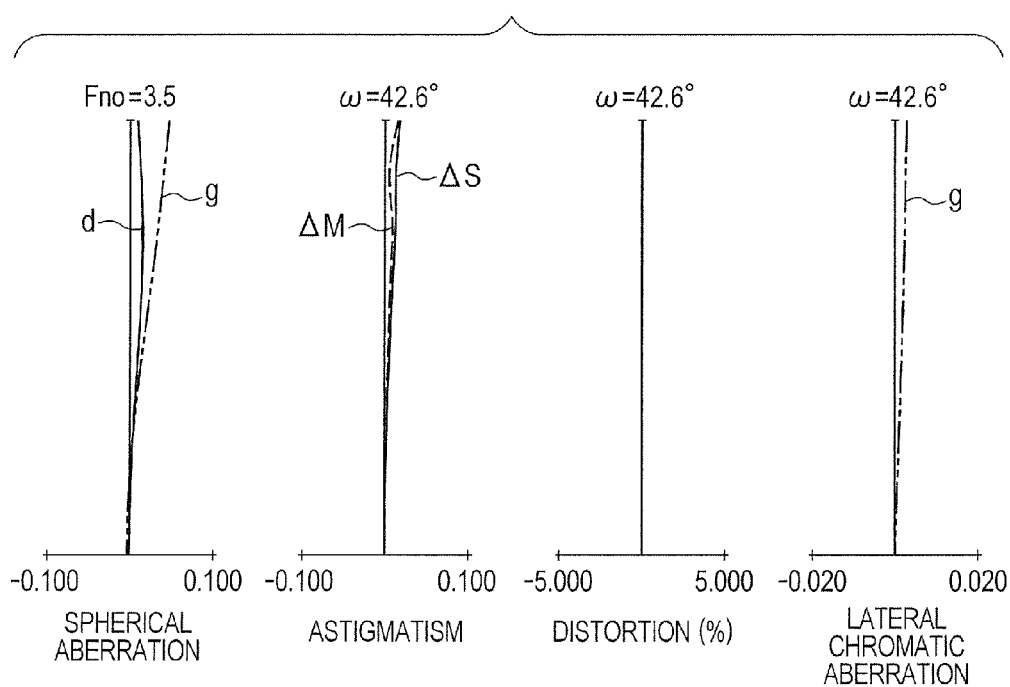
FIG. 14C is aberration diagrams of Embodiment 7 at a longest focal length.

FIG. 13 is a lens cross-sectional view of a zoom lens according to Embodiment 7 of the present invention at a shortest focal length. FIG. 14A, FIG. 14B, and FIG. 14C are aberration diagrams of the zoom lens according to Embodiment 7 at the shortest focal length, an intermediate focal length, and a longest focal length, respectively. Embodiment 7 relates to a zoom lens having a zoom ratio of 5.00 and an F-number of from 1.60 to 3.50.

Figure 15:
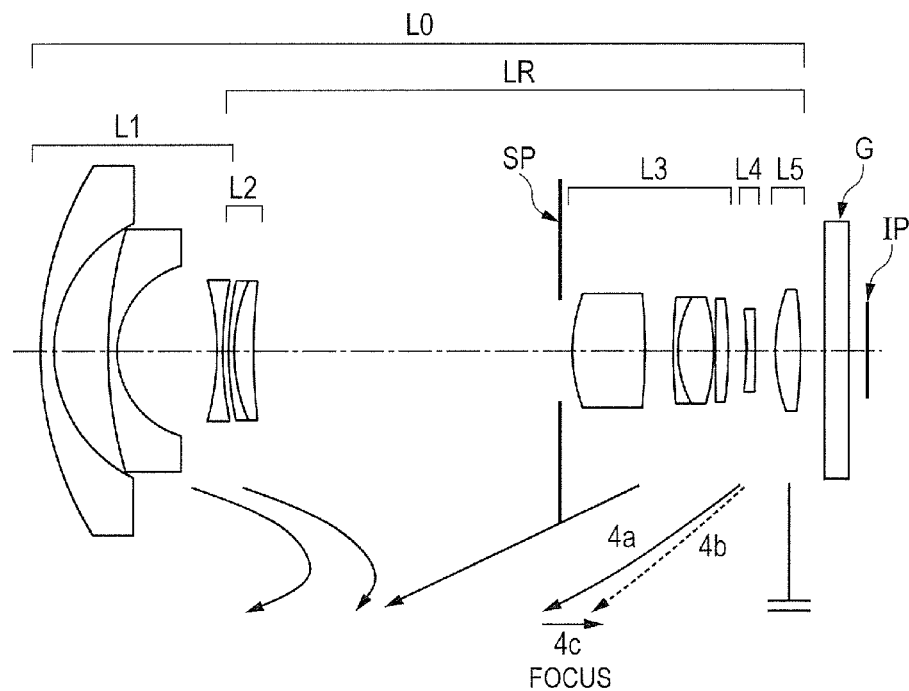
FIG. 15 is a lens cross-sectional view of Embodiment 8 of the present invention at a shortest focal length.
Figure 16A:
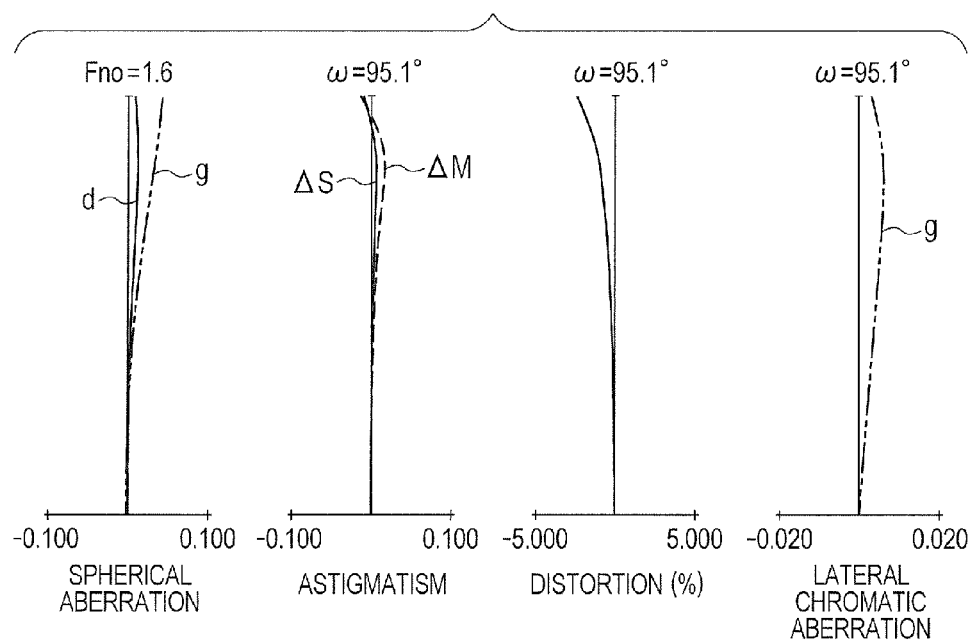
FIG. 16A is aberration diagrams of Embodiment 8 at the shortest focal length.
Figure 16B:
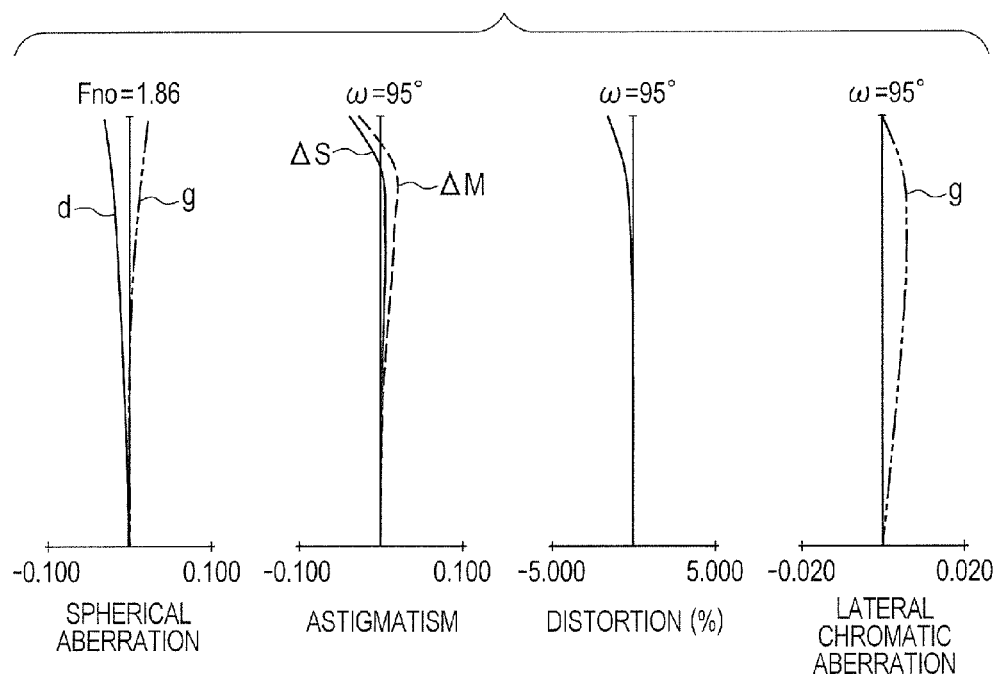
FIG. 16B is aberration diagrams of Embodiment 8 at an intermediate focal length.
Figure 16C:
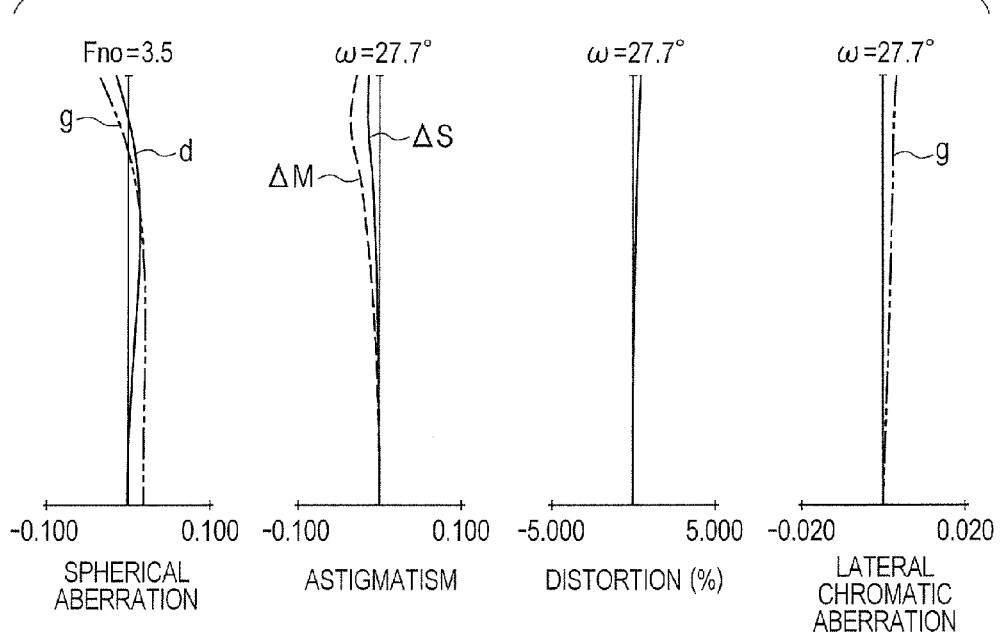
FIG. 16C is aberration diagrams of Embodiment 8 at a longest focal length.

FIG. 15 is a lens cross-sectional view of a zoom lens according to Embodiment 8 of the present invention at a shortest focal length. FIG. 16A, FIG. 16B, and FIG. 16C are aberration diagrams of the zoom lens according to Embodiment 8 at the shortest focal length, an intermediate focal length, and a longest focal length, respectively. Embodiment 8 relates to a zoom lens having a zoom ratio of 4.99 and an F-number of from 1.60 to 3.50.

Figure 17:
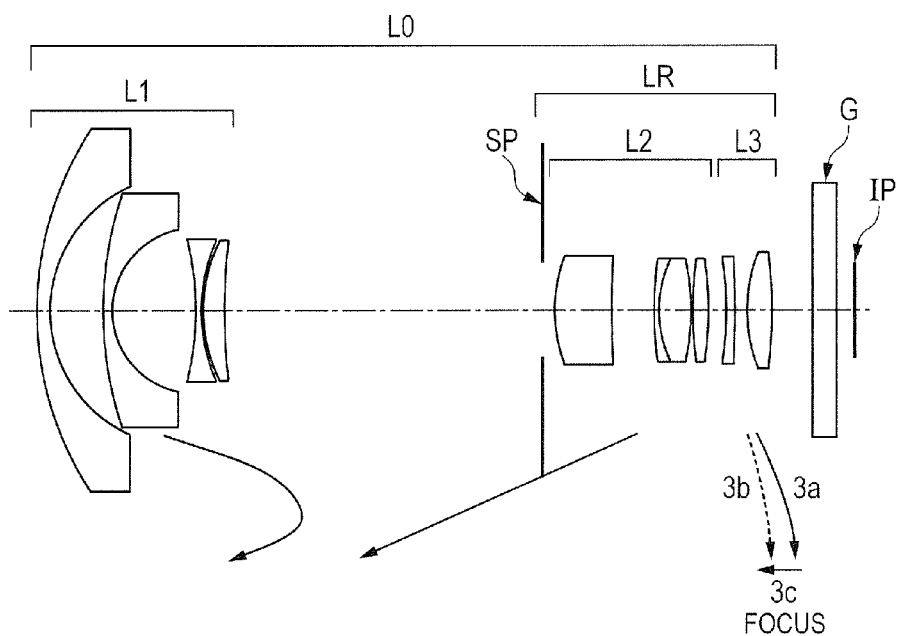
FIG. 17 is a lens cross-sectional view of Embodiment 9 of the present invention at a shortest focal length.
Figure 18A:
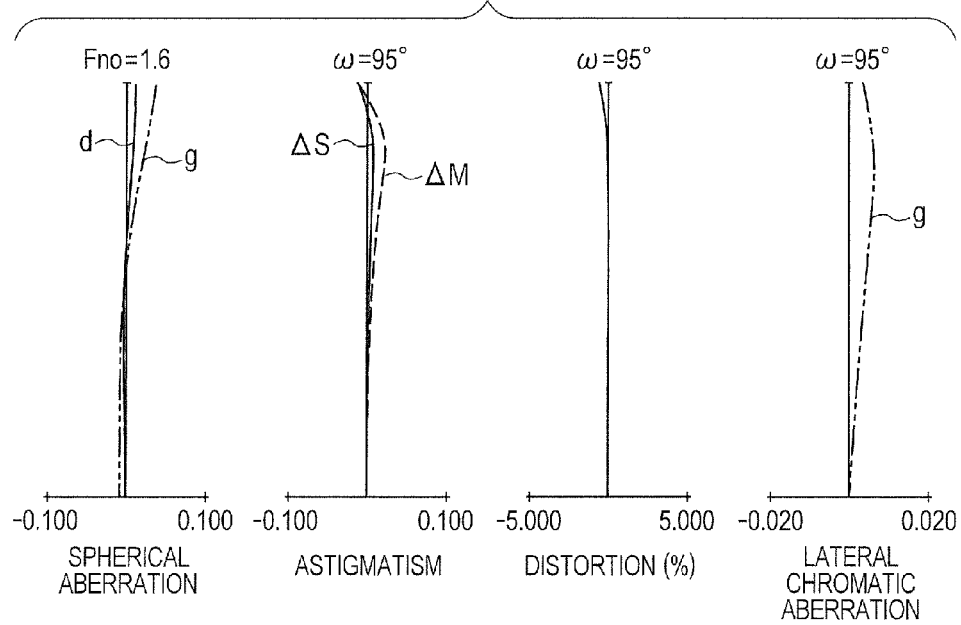
FIG. 18A is aberration diagrams of Embodiment 9 at the shortest focal length.
Figure 18B:
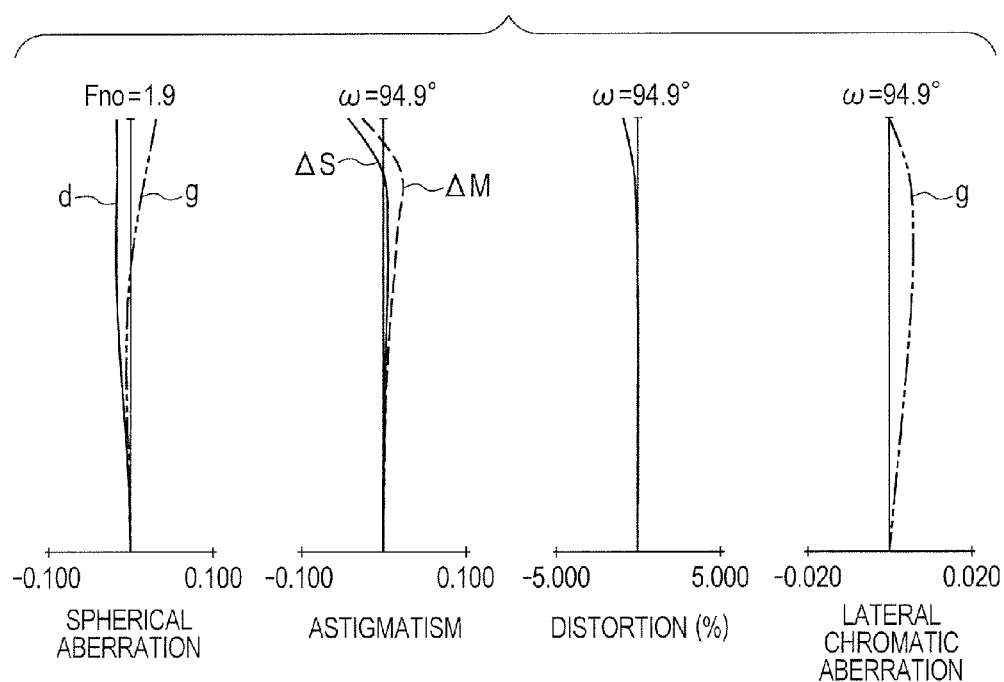
FIG. 18B is aberration diagrams of Embodiment 9 at an intermediate focal length.
Figure 18C:
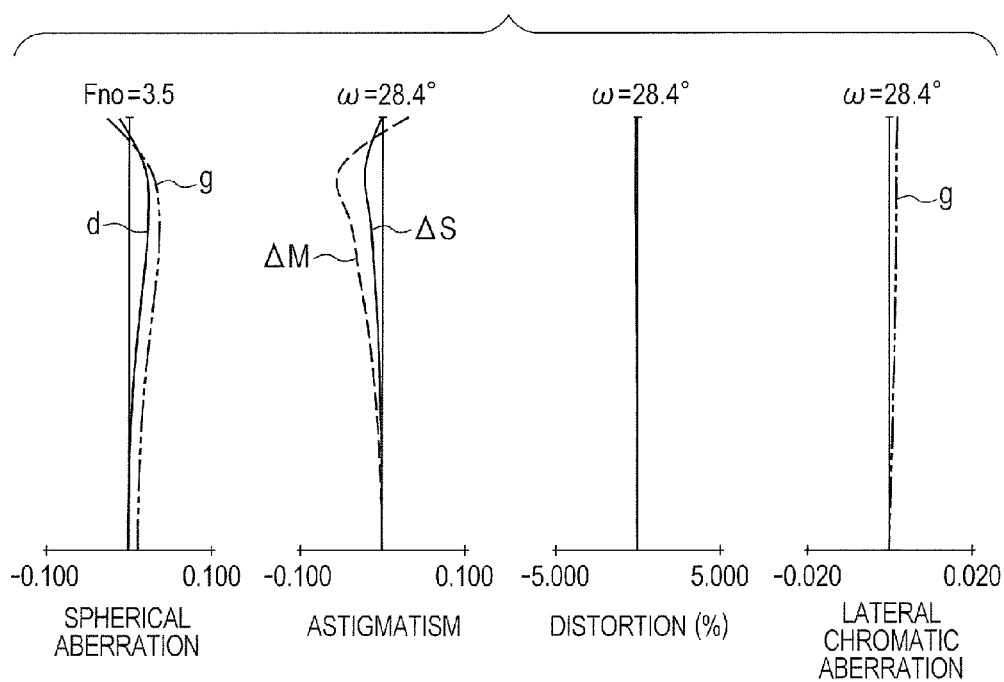
FIG. 18C is aberration diagrams of Embodiment 9 at a longest focal length.

FIG. 17 is a lens cross-sectional view of a zoom lens according to Embodiment 9 of the present invention at a shortest focal length. FIG. 18A, FIG. 18B, and FIG. 18C are aberration diagrams of the zoom lens according to Embodiment 9 at the shortest focal length, an intermediate focal length, and a longest focal length, respectively. Embodiment 9 relates to a zoom lens having a zoom ratio of 4.99 and an F-number of from 1.60 to 3.50.

Figure 19:
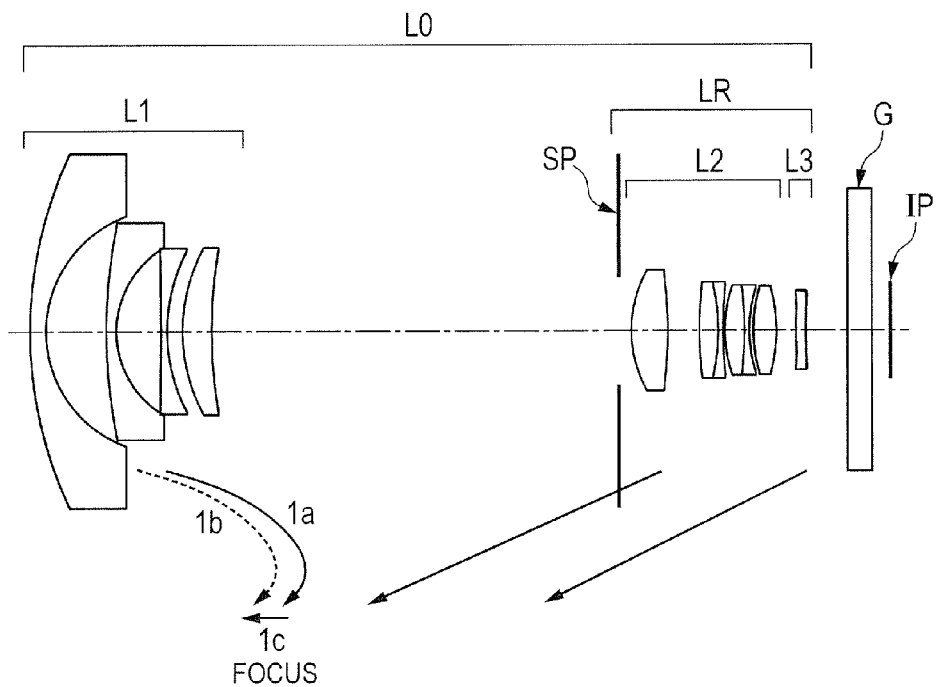
FIG. 19 is a lens cross-sectional view of Embodiment 10 of the present invention at a shortest focal length.
Figure 20A:
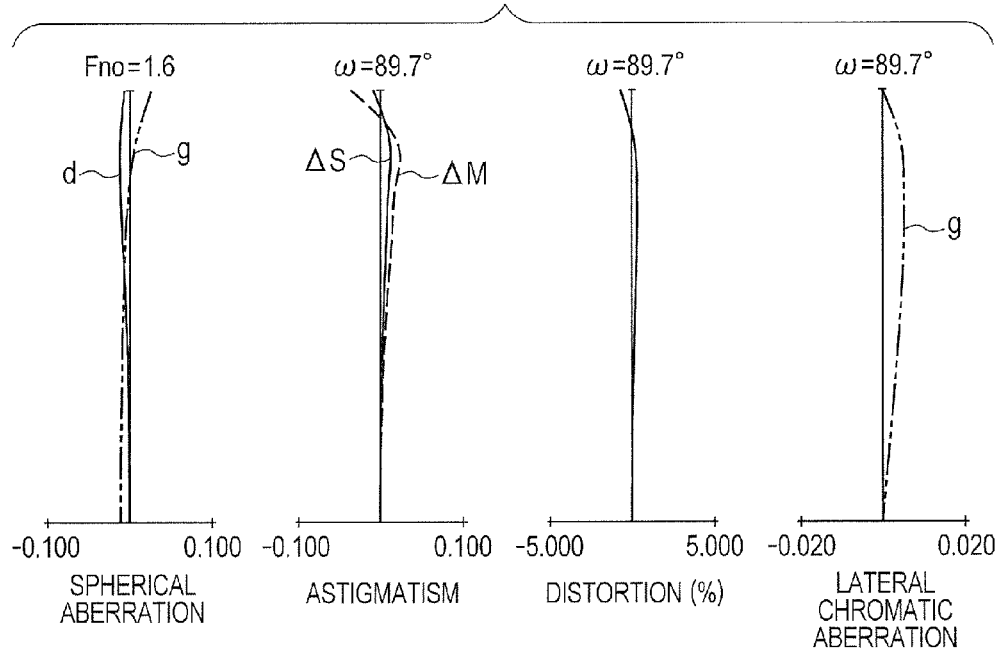
FIG. 20A is aberration diagrams of Embodiment 10 at the shortest focal length.
Figure 20B:
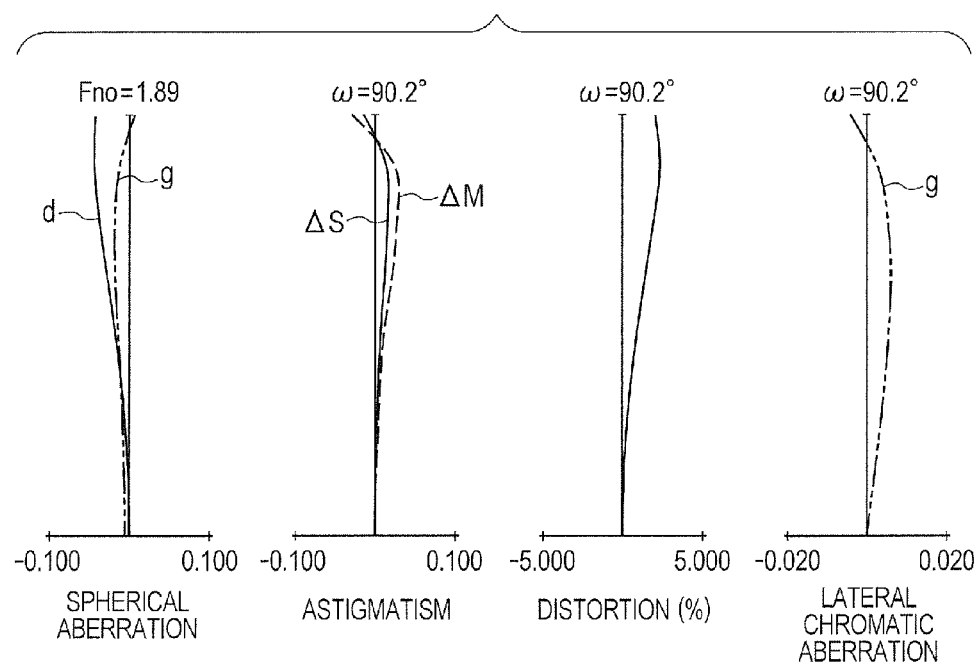
FIG. 20B is aberration diagrams of Embodiment 10 at an intermediate focal length.
Figure 20C:
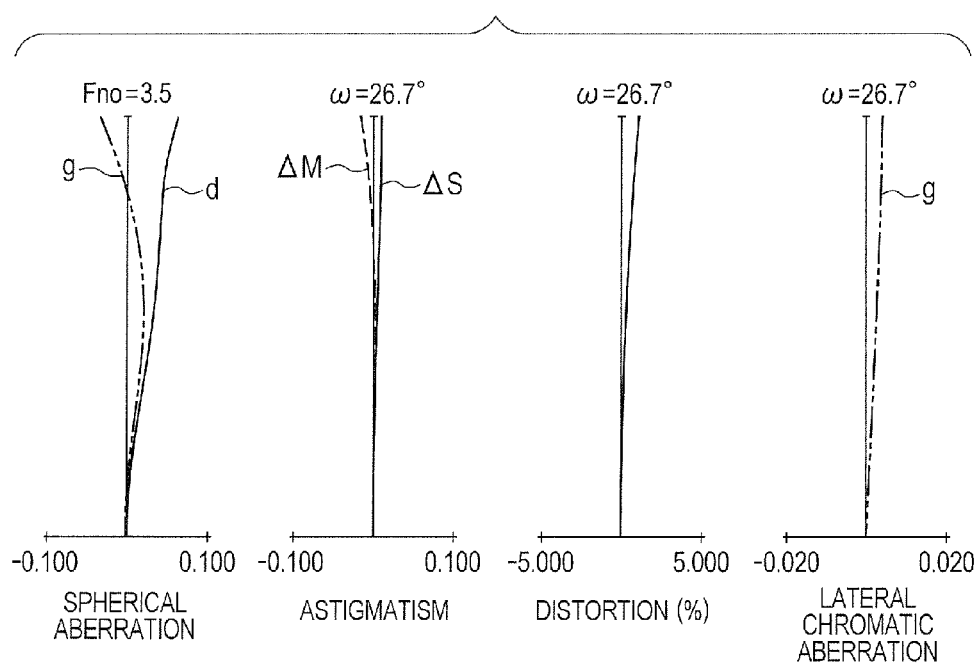
FIG. 20C is aberration diagrams of Embodiment 10 at a longest focal length.

FIG. 19 is a lens cross-sectional view of a zoom lens according to Embodiment 10 of the present invention at a shortest focal length. FIG. 20A, FIG. 20B, and FIG. 20C are aberration diagrams of the zoom lens according to Embodiment 10 at the shortest focal length, an intermediate focal length, and a longest focal length, respectively. Embodiment 10 relates to a zoom lens having a zoom ratio of 5.00 and an F-number of from 1.60 to 3.50.

Figure 21:
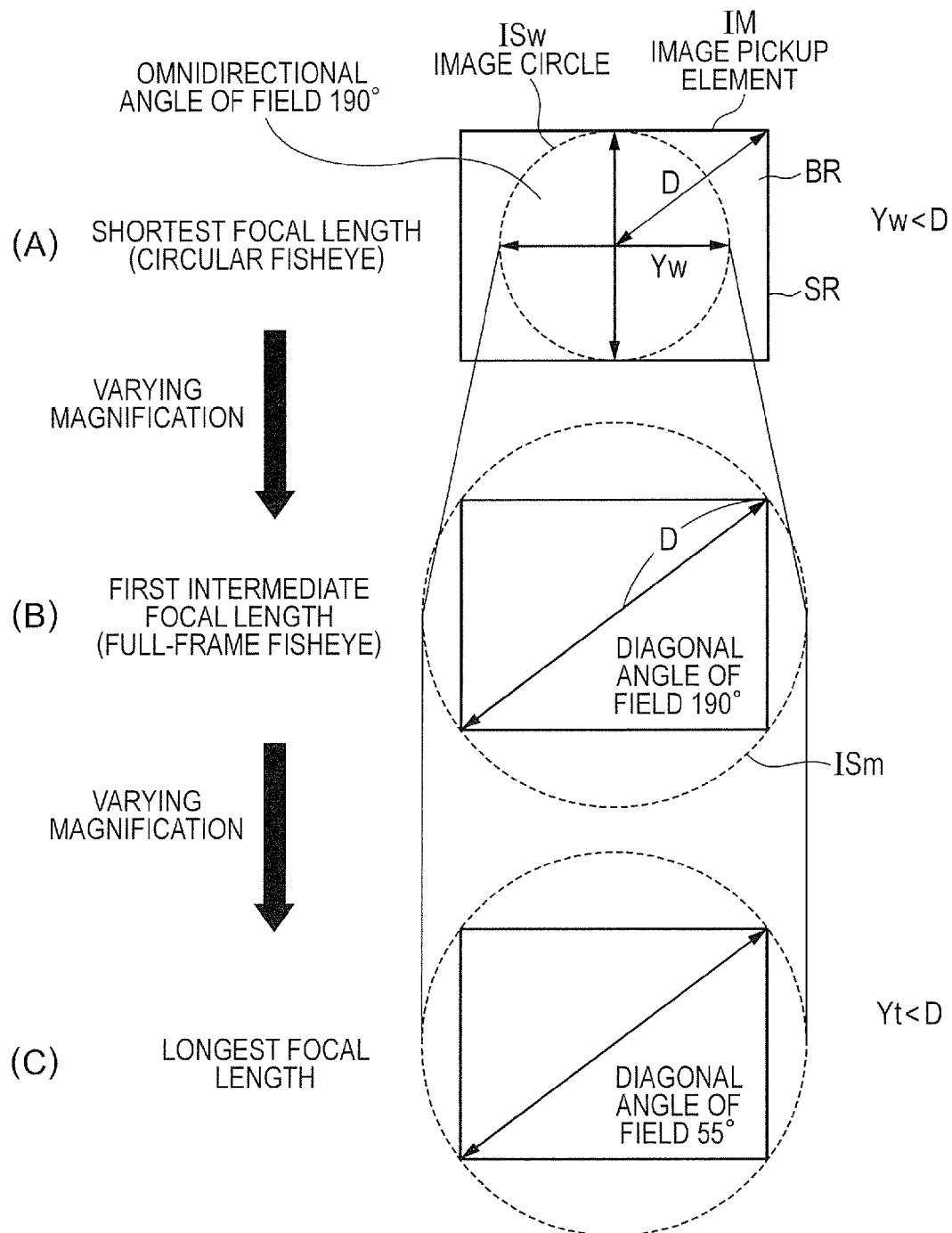
FIG. 21 is a schematic diagram of image circles and an image pickup element of a zoom lens according to the present invention at respective magnification-varying positions.
Figure 22:
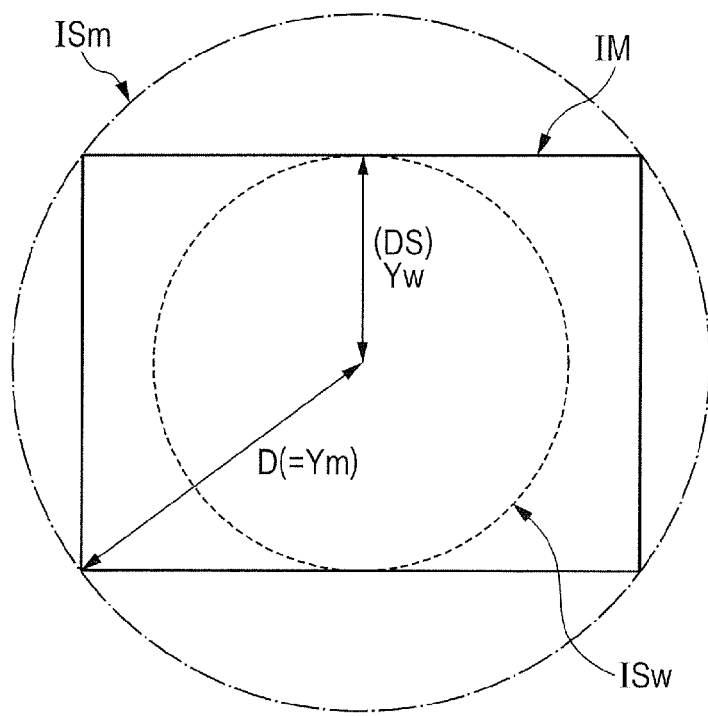
FIG. 22 is a schematic diagram of the image circles and the image pickup element of the zoom lens according to the present invention.
Figure 23:
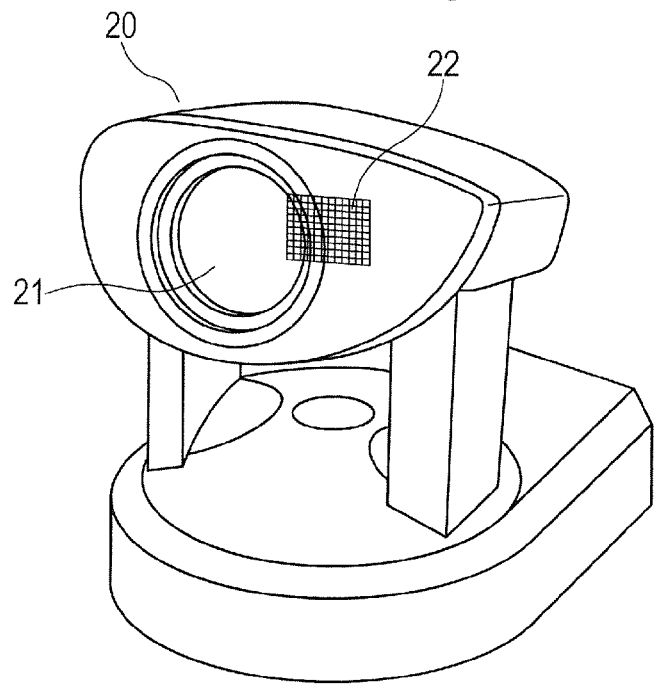
FIG. 23 is a schematic diagram of a main part of an image pickup apparatus according to the present invention.

FIG. 21 is an explanatory diagram for illustrating relationships between image circles and the image pickup element at respective zoom positions in a zoom lens according to the present invention. FIG. 22 is an explanatory diagram for illustrating a relationship between the image circles and the image pickup element in the zoom lens according to the present invention. FIG. 23 is a schematic diagram of a main part of an image pickup apparatus according to the present invention.

The zoom lens in each of Embodiments is an image pickup optical system used for a surveillance camera. The zoom lens in each of Embodiments may also be used for an image pickup apparatus such as a video camera, a digital camera, a silver-halide film camera, or a television (TV) camera.

In the lens cross-sectional views, the left side is the object side (front), and the right side is the image side (rear). A zoom lens L0 is illustrated in each of the lens cross-sectional views. A rear group LR includes a plurality of lens units, which include a lens unit having a positive refractive power. When the order of a lens unit from the object side is represented by i, the i-th lens unit is represented by Li. An aperture stop SP and an optical block G such as a filter are also illustrated. An image plane IP corresponds to an image pickup surface of a solid-state image pickup element (photoelectric conversion element) such as a CCD sensor or a CMOS sensor when the zoom lens is used as an image pickup optical system for a digital camera, a video camera, or a surveillance camera.

Alternatively, when the zoom lens is used as an image pickup optical system for a silver-halide film camera, the image plane IP corresponds to a film surface. In the zoom lens in each of Embodiments, the interval between each pair of adjacent lens units is changed during zooming. The arrows indicate movement loci of the respective lens units during zooming from the shortest focal length to the longest focal length. Similarly, the arrow regarding the focus indicates a movement direction of the lens unit during focusing from infinity to close distance.

In the spherical aberration diagram, the solid line d indicates a d-line (wavelength: 587.6 nm), and the two-dot chain line g indicates a g-line (wavelength: 435.8 nm). In the astigmatism diagram, the dotted line ΔM indicates a meridional image plane for the d-line, and the solid line ΔS indicates a sagittal image plane for the d-line. The distortion is shown as a value of the d-line with respect to an equi-solid angle projection type. The lateral chromatic aberration is shown by the g-line. A half angle of field (in degrees) is represented by ω, and an F-number is represented by Fno. In each of Embodiments, the shortest focal length and the longest focal length refer to zoom positions when a lens unit for varying magnification is positioned at respective ends of its mechanically movable range on an optical axis.

The zoom lens according to the present invention consists of the first lens unit having the negative refractive power, which is arranged closest to the object side, and the rear group LR including the plurality of lens units, which include the lens unit having the positive refractive power, and which is arranged on the image side of the first lens unit. Then, the interval between each pair of adjacent lens units is changed to perform zooming.

With the configuration in which the intervals among the three or more plurality of lens units are changed to perform zooming as described above, a high zoom ratio is attained from a circular fisheye state at the shortest focal length, through a diagonal fisheye state at the intermediate focal length, and to a standard angle of field at the longest focal length. In addition, variations in aberrations, which are caused by a large variation in angle of field accompanying zooming, are satisfactorily reduced over the entire zoom range.

When a focal length of an entire system of the zoom lens is the shortest focal length, the zoom lens according to the present invention has a maximum image height that is smaller than a diagonal length of the rectangular image pickup region. As a result, there are regions in which the subject image is not formed in peripheral portions in a long side direction and a diagonal direction of the rectangular image pickup region. Further, the maximum image height at the shortest focal length is set to substantially match a half the length of a short side of the image pickup region of the image pickup element, to thereby adopt a circular fisheye type.

Moreover, during zooming from the shortest focal length to the longest focal length, the maximum image height is increased continuously and monotonously up to the intermediate focal length. A focal length of the entire system of the zoom lens at which the maximum image height becomes a length D that is a half of the diagonal length of the rectangular image pickup region is defined as the intermediate focal length. A zoom position at that time is the diagonal fisheye state. The zooming is further performed from this zoom position to the longest focal length.

In the image pickup apparatus according to the present invention, a combination of the zoom lens and the image pickup element having the rectangular image pickup region is used to capture the subject image.

FIG. 21 is the explanatory diagram for illustrating relationships between an image pickup element IM and the image pickup region. A maximum image height Yw at the shortest focal length in part (A) of FIG. 21 is shorter than the length D that is a half of the diagonal length of a rectangular image pickup region SR, and there are regions BR in which the subject image is not formed in peripheral portions in a long side direction and a diagonal direction of the rectangular image pickup region SR. Further, the maximum image height Yw at the shortest focal length is set to substantially match the length that is a half of a short side of the image pickup element IM to establish the circular fisheye state.

Moreover, during zooming from the shortest focal length in part (A) of FIG. 21 to the longest focal length in part (C) of FIG. 21, a maximum image height Y is increased continuously and monotonously up to the intermediate focal length illustrated in part (B) of FIG. 21. A focal length at which the maximum image height Y first exceeds the length D that is a half of the diagonal length of the rectangular image pickup element IM is referred to herein as the intermediate focal length. This magnification-varying position establishes the diagonal fisheye state. A magnification is further varied from this magnification-varying position to the longest focal length.

In parts (A), (B), and (C) of FIG. 21, relationships between an image circle diameter, which is changed accompanying zooming, and the image pickup element IM are illustrated taking Embodiment 1 as an example. As illustrated in part (A) of FIG. 21, at the shortest focal length, the length of the short side of the image pickup element IM and the image circle diameter substantially match to establish the circular fisheye state having an angle of field of 190 degrees omnidirectionally. The magnification is varied from the shortest focal length to increase the image circle diameter so that, at the intermediate focal length illustrated in part (B) of FIG. 21, the diagonal length of the image pickup element IM and the image circle diameter substantially match to establish the diagonal fisheye state having an angle of field of 190 degrees in a diagonal direction.

As illustrated in part (C) of FIG. 21, the diagonal length of the image pickup element IM and the image circle diameter substantially match also at the longest focal length to obtain a diagonal angle of field of degrees, which is the standard angle of field. A "radius of the image circle" as used herein and the maximum image height Y at each of the focal lengths substantially match. However, a maximum image height Yt at the longest focal length may be smaller than the length D that is a half of the diagonal length of the image pickup element IM. This is because a combination with so-called digital zooming, in which an effective image pickup region is changed by image processing, may be applied.

In the zoom lens according to the present invention, a focal length of the entire system of the zoom lens at the longest focal length is represented by ft. A half angle of field of the entire system of the zoom lens at the longest focal length is represented by $\omega t$, and a half angle of field at the shortest focal length is represented by $\omega w$. A half angle of field at the intermediate focal length is represented by $\omega m$. An image height at the shortest focal length is represented by Yw, and the length that is a half of the diagonal length of the rectangular image pickup element IM is represented by D. At this time, the following conditional expressions are satisfied:

$$0.75 < D/(ft \times \tan(\omega t)) < 1.10 \qquad (1); \text{ and}$$

$$1.4 < D/Yw < 2.6 \qquad (2).$$

In general, when an image height is represented by Y, a focal length is represented by f, and a half angle of field is represented by $\omega$, a fisheye lens adopts projection types that satisfy the following conditional expressions.

$Y=2f \times \sin(\omega/2)$      Equi-solid angle projection type $Y=2f \times \tan(\omega/2)$      Stereographical projection type $Y=f \times \omega$      Equi-distance projection type $Y=f \times \sin \omega$      Orthographic projection type Meanwhile, the zoom lens according to the present invention attains a high zoom ratio as a fisheye zoom lens, and has a standard angle of field for a lens of a central projection type, which is expressed as $Y=f \times \tan \omega$, at the longest focal length. Therefore, a large distortion results in an unnatural picture.

FIG. 22 is a schematic diagram of the image circles captured by the zoom lens according to the present invention and an image pickup surface of the image pickup element used in the image pickup apparatus. In the figure, a rectangular image pickup element IM has a diagonal length of 2×D.

The conditional expression (1) defines a ratio of the length D that is a half of the diagonal length of the above-mentioned image pickup element IM to an ideal image height $ft \times \tan(\omega t)$ of the central projection type at the longest focal length, and defines a numerical value range in which too large a distortion is not generated. When the ratio falls below the lower limit value of the conditional expression (1), too large a barrel distortion is generated and disadvantageously results in the unnatural picture. When the ratio exceeds the upper limit value of the conditional expression (1), too large a pincushion distortion is generated and disadvantageously results in the unnatural picture.

In FIG. 22, an image circle at the shortest focal length is denoted by ISw, and the maximum image height Yw substantially matches a radius of the image circle ISw. The maximum image height Yw also substantially matches a half DS of the length of the short side of the rectangular image pickup element IM. An image circle at the intermediate focal length is denoted by ISm, and a maximum image height Ym at the intermediate focal length substantially matches a length D that is a half of the diagonal length of the image pickup element IM.

The conditional expression (2) defines a ratio of the length D that is a half of the diagonal length of the rectangular image pickup element IM to the maximum image height Yw at the shortest focal length. Rectangular image pickup elements IM having various aspect ratios of a long side to the short side, such as 3:2, 4:3, and 16:9, are available. In a circular fisheye state, a state with the smallest regions in which the subject image is not formed in the peripheral portions of the rectangular image pickup region is an aspect ratio of 1:1, at which the lengths of the long side and the short side are equal, and as the ratio becomes larger, the regions in which the subject image is not formed become larger.

In each of Embodiments 1 to 5, and 8 to 10, a ratio of the long side to the short side of the image pickup element IM is 4:3. In Embodiment 6, a ratio of the long side to the short side of the image pickup element IM is 1:1. In Embodiment 7, a ratio of the long side to the short side of the image pickup element IM is 2.35:1.

When the ratio falls below the lower limit value of the conditional expression (2), the maximum image height Yw at the shortest focal length exceeds the half DS of the length of the short side of the rectangular image pickup element IM, and hence a dead angle is disadvantageously generated in peripheral portions of a picture in a short side direction of the image pickup element IM. When the ratio exceeds the upper limit value of the conditional expression (2), the regions in which the subject image is not formed in the peripheral portions of the rectangular image pickup region become much larger, and a resolution of the picture captured at the shortest focal length becomes disadvantageously lower. It is more preferred to set the numerical value ranges of the conditional expressions (1) and (2) as follows.

$$0.78 < D/(ft \times \tan(\omega t)) < 1.05 \qquad (1a)$$

$$1.40 < D/Yw < 2.57 \qquad (2a)$$

In addition, it is still more preferred to set the numerical value ranges of the conditional expressions (1a) and (2a) as follows.

$$0.785 < D/(ft \times \tan(\omega t)) < 1.00 \tag{1b}$$

$$1.40 < D/Yw < 2.56 \tag{2b}$$

With the above-mentioned configuration, a wide angle of field with a half angle of field of 80 degrees or more at the shortest focal length is obtained. As a result, the zoom lens having the high zoom ratio and high optical performance, which facilitates enlarged photography of a subject at an angle of field of about a standard angle of field at the longest focal length, is obtained. It is further preferred to satisfy one or more of conditional expressions provided below. A half angle of field at the shortest focal length is represented by ωw (degrees), and a half angle of field at the intermediate focal length is represented by ωm (degrees).

A lens unit Lmp having a positive refractive power included in the rear group LR is configured to move monotonously from the image side toward the object side during zooming from the shortest focal length to the longest focal length, and is a lens unit having the largest movement amount during zooming. Then, a focal length of the lens unit Lmp is represented by fp, and a movement amount of the lens unit Lmp during zooming from the shortest focal length to the longest focal length is represented by mp. In this specification, as a result of moving a lens unit during zooming from the shortest focal length to the longest focal length, a sign of a movement amount of the lens unit is negative when the lens unit is positioned closer to the object side at the longest focal length than at the shortest focal length, and is positive when the lens unit is positioned closer to the image side at the longest focal length than at the shortest focal length.

A first lens unit L1 includes, in order from the object side to the image side, a first negative lens having a meniscus shape with a convex surface thereof facing the object side, and a second negative lens having a meniscus shape with a convex surface thereof facing the object side. At this time, curvature radii of lens surfaces on the object side and the image side of the first negative lens are represented by R1a and R1b, respectively, and curvature radii of lens surfaces on the object side and the image side of the second negative lens are represented by R2a and R2b, respectively.

When the first lens unit L1 has three negative lenses successively arranged closest to the object side and in order toward the image side, focal lengths of the three negative lenses are represented by fG1, fG2, and fG3, respectively, in order from the object side to the image side. A focal length of the first lens unit is represented by f1. At this time, it is preferred to satisfy one or more of the following conditional expressions.

$$0.9 < \omega m/\omega w < 1.1 \tag{3}$$

$$80° < \omega w < 115° \tag{4}$$

$$1.0 < |mp/fp| < 4.0 \tag{5}$$

$$1.0 < (R1a+R1b)/(R1a-R1b) < 4.5 \tag{6}$$

$$0.5 < (R2a+R2b)/(R2a-R2b) < 3.5 \tag{7}$$

$$0.8 < fG1/fG2 < 4.0 \tag{8}$$

$$0.3 < fG2/fG3 < 1.5 \tag{9}$$

$$0.2 < |f1/fp| < 0.7 \tag{10}$$

$$0.4 < fp/ft < 3.0 \tag{11}$$

Next, technical meanings of the above-mentioned conditional expressions are described. In the zoom lens according to the present invention, the lens unit Lmp having the positive refractive power included in the rear group LR is a main magnification-varying lens unit. In the zoom lens according to the present invention, in order to obtain the high zoom ratio and a bright F-number, and to attain downsizing of the entire system, a power arrangement of the main magnification-varying lens unit and the movement amount of the lens unit Lmp during zooming are appropriately set.

The conditional expression (3) defines a ratio of the maximum half angle of field ωw at the shortest focal length to the maximum half angle of field ωm at the intermediate focal length. When the ratio exceeds the upper limit value or falls below the lower limit value of the conditional expression (3), the angle of field is changed too much while varying magnification from the circular fisheye state to the diagonal fisheye state, and the subject in the peripheral portions of the image plane may be disadvantageously left out of the image because of the zooming in some cases.

The conditional expression (4) defines the maximum half angle of field at the shortest focal length. A surveillance camera or the like, in particular, is installed on a ceiling or a wall surface in many cases, and is required to have a wide angle of field of about 180 degrees in order to reduce the dead angle as the fisheye lens. When ωw falls below the lower limit value of the conditional expression (4), the dead angle is generated, and a desired subject may not be captured, which should not happen. When ωw exceeds the upper limit value of the conditional expression (4), the refractive power of, in particular, the first lens unit having the negative refractive power becomes so strong that various off-axis aberrations are increased, with the result that it becomes difficult to obtain the high optical performance while realizing the high zoom ratio.

The conditional expression (5) defines a ratio of the movement amount mp of the lens unit Lmp during zooming from the shortest focal length to the longest focal length to the focal length fp of the lens unit Lmp. When the ratio falls below the lower limit value of the conditional expression (5), and the movement amount becomes smaller, it becomes difficult to realize the high zoom ratio. In addition, the refractive power of the lens unit Lmp becomes much weaker, and the movement amount of the lens unit Lmp during zooming is increased, with the result that it becomes difficult to downsize the entire system.

When the ratio exceeds the upper limit value of the conditional expression (5), and the movement amount becomes much larger, it becomes difficult to downsize the entire system. In addition, the refractive power of the lens unit Lmp becomes stronger, and generated amounts of various aberrations are increased, with the result that it becomes difficult to obtain the high optical performance.

The zoom lens according to the present invention has an angle of field of from about 160 degrees to about 220 degrees in the circular fisheye state to the diagonal fisheye state, and an angle of incidence of a light beam on the first lens unit L1 is substantially orthogonal to the optical axis. In this manner, the zoom lens according to the present invention attains a half angle of field of 80 degrees or more at the shortest focal length, and the angle of incidence of the light beam on the first lens unit L1 with respect to the optical axis is large. Therefore, there is a need to bend (refract) an incident light beam at a large angle in the first lens unit L1.

Meanwhile, when the light beam is bent too abruptly, various aberrations regarding a peripheral image height, such as the distortion and a field curvature in particular, are increased, and hence it becomes important to appropriately set a lens configuration, lens shapes, a power arrangement, and other such factors in the first lens unit L1.

In the zoom lens according to the present invention, in order to bend the incident light beam at the large angle while maintaining the high optical performance, the first lens unit L1 includes two negative lenses, which are arranged successively in order from the object side to the image side, and each of which has the meniscus shape with the convex surface thereof facing the object side. It is more preferred to arrange another negative lens on the image side of the two negative lenses.

The conditional expression (6) defines a lens shape (shape factor) of the first negative lens having the meniscus shape included in the first lens unit L1. The conditional expression (7) defines a lens shape of the second negative lens having the meniscus shape included in the first lens unit L1. When the ratio falls below the lower limit value of the conditional expression (6) or the conditional expression (7), the refractive powers of both the first negative lens and the second negative lens become much stronger, and it becomes difficult to obtain the high optical performance.

When the ratio exceeds the upper limit value of the conditional expression (6) or the conditional expression (7), in each of the first negative lens and the second negative lens, values of the curvature radii of the lens surface on the object side and the lens surface on the image side become closer to each other. As a result, the refractive powers of the first negative lens and the second negative lens become much weaker, and it becomes disadvantageously difficult to obtain the wide angle of field.

The conditional expression (8) and the conditional expression (9) define ratios of the focal lengths of the three negative lenses: the first negative lens, the second negative lens, and the third negative lens, which are arranged successively in order from the object side to the image side in the first lens unit L1. When the ratio falls below the lower limit value of the conditional expression (8), the negative refractive power of the first negative lens is too strong, with the result that it becomes difficult to correct the distortion, or the negative refractive power of the second negative lens is too weak, with the result that it becomes difficult to obtain the wide angle of field. When the ratio exceeds the upper limit value of the conditional expression (8), the negative refractive power of the first negative lens becomes much weaker, with the result that it becomes difficult to attain the wide angle of field, or the negative refractive power of the second negative lens is too strong, with the result that the distortion and the field curvature are undercorrected, and that it becomes difficult to obtain the high optical performance.

When the ratio falls below the lower limit value of the conditional expression (9), the negative refractive power of the second negative lens is too strong, with the result that the distortion and the field curvature are undercorrected, and that it becomes difficult to obtain the high optical performance, or the negative refractive power of the third negative lens is too weak, with the result that it becomes difficult to obtain the wide angle of field. When the ratio exceeds the upper limit value of the conditional expression (9), the negative refractive power of the second negative lens is too weak, with the result that it becomes difficult to obtain the wide angle of field, or the negative refractive power of the third negative lens is too strong, with the result that a coma and the field curvature are undercorrected, and that it becomes difficult to obtain the high optical performance.

The conditional expression (10) defines a ratio of the focal length f1 of the first lens unit L1 having the negative refractive power to the focal length fp of the lens unit Lmp having the positive refractive power included in the rear group LR. When the ratio falls below the lower limit value of the conditional expression (10), and the negative refractive power of the first lens unit L1 becomes much stronger, that is, an absolute value of the negative refractive power becomes much larger, divergence of an incident light flux on the lens unit Lmp is too strong, and it becomes difficult to attain the bright F-number. In addition, the positive refractive power of the lens unit Lmp becomes much weaker, and the movement amount of the lens unit Lmp during zooming is too large, with the result that it becomes difficult to downsize the entire system.

When the ratio exceeds the upper limit value of the conditional expression (10), and the negative refractive power of the first lens unit L1 becomes much weaker, the movement amount of the first lens unit L1 during zooming becomes much larger, and it becomes difficult to downsize the entire system. In addition, the positive refractive power of the lens unit Lmp becomes much stronger, and the generated amounts of various aberrations are increased, with the result that it becomes difficult to obtain the high optical performance.

The conditional expression (11) defines a ratio of the focal length fp of the lens unit Lmp having the positive refractive power to the focal length ft of the entire system of the zoom lens at the longest focal length. When the ratio falls below the lower limit value of the conditional expression (11), and the positive refractive power of the lens unit Lmp becomes stronger, the generated amounts of various aberrations are increased, and it becomes difficult to obtain the high optical performance. When the ratio exceeds the upper limit value of the conditional expression (11), and the positive refractive power of the lens unit Lmp becomes weaker, the movement amount of the lens unit Lmp during zooming becomes much larger, and it becomes difficult to downsize the entire system.

In each of Embodiments, it is more preferred to set the numerical value ranges of the conditional expression (3) to (11) as follows.

$$0.95 < \omega m/\omega w < 1.05 \tag{3a}$$

$$85° < \omega w < 115° \tag{4a}$$

$$1.05 < |mp/fp| < 3.50 \tag{5a}$$

$$1.5 < (R1a+R1b)/(R1a-R1b) < 4.0 \tag{6a}$$

$$0.8 < (R2a+R2b)/(R2a-R2b) < 3.0 \tag{7a}$$

$$1.0 < fG1/fG2 < 3.5 \tag{8a}$$

$$0.4 < fG2/fG3 < 1.3 \tag{9a}$$

$$0.25 < |f1/fp| < 0.65 \tag{10a}$$

$$0.5 < fp/ft < 2.5 \tag{11a}$$

In addition, it is still more preferred to set the numerical value ranges of the conditional expression (3a) to (11a) as follows.

$$0.97 < \omega m/\omega w < 1.02 \quad (2b)$$

$$90° < \omega w < 115° \quad (3b)$$

$$1.15 < |mp/fp| < 2.60 \quad (5b)$$

$$1.8 < (R1a+R1b)/(R1a-R1b) < 3.1 \quad (6b)$$

$$1.3 < (R2a+R2b)/(R2a-R2b) < 2.3 \quad (7b)$$

$$1.3 < fG1/fG2 < 3.0 \quad (8b)$$

$$0.5 < fG2/fG3 < 1.1 \quad (9b)$$

$$0.29 < |f1/fp| < 0.57 \quad (10b)$$

$$0.7 < fp/ft < 2.1 \quad (11b)$$

Moreover, in the zoom lens according to the present invention, it is preferred that the rear group LR consist, in order from the object side to the image side, of a second lens unit L2 having a positive refractive power, a third lens unit L3 having a negative refractive power, and a fourth lens unit L4 having a positive refractive power. It is also preferred that the first lens unit L1, the second lens unit L2, and the third lens unit L3 be configured to move during zooming. In this manner, the lens units having refractive powers of different signs: negative, positive, negative, and positive are alternately arranged in order from the object side to the image side to increase the refractive powers of the lens units, and to facilitate realization of the high zoom ratio.

Moreover, the main magnification-varying lens unit is the second lens unit L2, and correction of a position of an image plane accompanying varying magnification is mainly performed by the first lens unit L1. The third lens unit L3 is configured to move independently. Therefore, variations in various aberrations during zooming, which accompany the realization of the high zoom ratio, are effectively suppressed to obtain the high optical performance. Alternatively, in the zoom lens according to the present invention, it is preferred that the rear group LR consist, in order from the object side to the image side, of a second lens unit L2 having a positive refractive power, a third lens unit L3 having a positive refractive power, a fourth lens unit L4 having a negative refractive power, and a fifth lens unit L5 having a positive refractive power. It is also preferred that the first lens unit L1 to the fourth lens unit L4 be configured to move during zooming.

The main magnification-varying lens unit is the third lens unit L3, and correction of a position of an image plane accompanying varying magnification is mainly performed by the first lens unit L1 and the second lens unit L2. The third lens unit L3 is configured to move independently. Therefore, variations in various aberrations during zooming, which accompany the realization of the high zoom ratio, are effectively suppressed to obtain the high optical performance. Moreover, the movement locus of the second lens unit L2 is slightly different from that of the first lens unit L1 to satisfactorily correct off-axis aberrations on the shortest focal length side, and to obtain the high optical performance.

Moreover, in the zoom lens according to the present invention, it is preferred that the rear group LR consist, in order from the object side to the image side, of a second lens unit L2 having a positive refractive power and a third lens unit L3 having a positive refractive power. It is also preferred that the first lens unit L1, the second lens unit L2, and the third lens unit L3 be configured to move during zooming.

The main magnification-varying lens unit is the second lens unit L2, and correction of a position of an image plane accompanying varying magnification is mainly performed by the first lens unit L1. The third lens unit L3 is configured to move independently. Therefore, variations in various aberrations during zooming, which accompany the realization of the high zoom ratio, are effectively suppressed to obtain the high optical performance. Alternatively, in the zoom lens according to the present invention, it is preferred that the rear group LR consist, in order from the object side to the image side, of a second lens unit L2 having a positive refractive power and a third lens unit L3 having a negative refractive power. It is also preferred that the first lens unit L1, the second lens unit L2, and the third lens unit L3 be configured to move during zooming.

The main magnification-varying lens unit is the second lens unit L2, and correction of a position of an image plane accompanying varying magnification is mainly performed by the first lens unit L1. The third lens unit L3 is configured to move independently. Therefore, variations in various aberrations during zooming, which accompany the realization of the high zoom ratio, are effectively suppressed to obtain the high optical performance.

A zoom lens according to another exemplary embodiment of the present invention includes, in order from an object side to an image side, a first lens unit L1 having a negative refractive power, a second lens unit L2 having a positive refractive power, and a rear group LR including one or more lens units. The first lens unit L1 and the second lens unit L2 are configured to move during zooming, and a lens unit interval between each pair of adjacent lens units is changed during zooming.

In each of Embodiments, the zoom lens is of a negative lead type and includes three or more lens units, and a lens unit interval between each pair of adjacent lens units is changed during zooming. With such lens configuration, it becomes easier to attain the high zoom ratio while suppressing, over the entire zoom range, the variations in aberrations due to a large variation in angle of field from a super wide angle fisheye state to a standard state in which the standard angle of field is reached.

In each of Embodiments, the first lens unit L1 includes, in order from the object side to the image side, at least two negative lenses: a first negative lens having a meniscus shape with a convex surface thereof facing the object side; and a second negative lens having a meniscus shape with a convex surface thereof facing the object side. The two negative lenses having the meniscus shape are successively arranged closest to the object side to reduce generation of various off-axis aberrations accompanying realization of a wide angle of field, and to facilitate the realization of the wide angle of field with the maximum half angle of field of 80 degrees or more at the shortest focal length.

A focal length of the first lens unit L1 is represented by f1, and a focal length of the second lens unit L2 is represented by f2. A movement amount of the second lens unit L2 accompanying zooming from the shortest focal length to the longest focal length is represented by m2. At this time, the following conditional expressions are satisfied:

$$0.2 < |f1/f2| < 0.7 \quad (12); \text{ and}$$

$$1.0 < |m2/f2| < 4.0 \quad (13).$$

In this specification, as a result of moving a lens unit during zooming from the shortest focal length to the longest focal length, a sign of a movement amount of the lens unit is negative when the lens unit is positioned closer to the object side at the longest focal length than at the shortest focal length, and is positive when the lens unit is positioned closer to the image side at the longest focal length than at the shortest focal length.

Next, technical meanings of the above-mentioned conditional expressions are described. In the zoom lens according to the present invention, the second lens unit L2 having the positive refractive power is a main magnification-varying lens unit. In the zoom lens according to the present invention, in order to obtain the high zoom ratio and a bright F-number, and to attain downsizing of the entire system, a power arrangement of the second lens unit and the movement amount of the second lens unit during zooming are appropriately set.

The conditional expression (12) defines a ratio of the focal length f1 of the first lens unit L1 having the negative refractive power to the focal length f2 of the second lens unit L2 having the positive refractive power. When the ratio falls below the lower limit value of the conditional expression (12), and the negative refractive power of the first lens unit L1 becomes much stronger, that is, an absolute value of the negative refractive power becomes much larger, divergence of an incident light flux on the second lens unit L2 is too strong, and it becomes difficult to attain the bright F-number. In addition, the positive refractive power of the second lens unit L2 becomes much weaker, and the movement amount of the second lens unit L2 during zooming is too large, with the result that it becomes difficult to downsize the entire system.

When the ratio exceeds the upper limit value of the conditional expression (12), and the negative refractive power of the first lens unit L1 becomes much weaker, the movement amount of the first lens unit L1 during zooming becomes much larger, and it becomes difficult to downsize the entire system. In addition, the positive refractive power of the second lens unit L2 becomes much stronger, and the generated amounts of various aberrations are increased, with the result that it becomes difficult to obtain the high optical performance.

The conditional expression (13) defines a ratio of the movement amount m2 of the second lens unit L2 during zooming from the shortest focal length to the longest focal length to the focal length f2 of the second lens unit L2. When the ratio falls below the lower limit value of the conditional expression (13), and the movement amount becomes smaller, it becomes difficult to realize the high zoom ratio. In addition, the refractive power of the second lens unit L2 becomes much weaker, and the movement amount of the second lens unit L2 during zooming is increased, with the result that it becomes difficult to downsize the entire system.

When the ratio exceeds the upper limit value of the conditional expression (13), and the movement amount becomes much larger, it becomes difficult to downsize the entire system. In addition, the refractive power of the second lens unit L2 becomes stronger, and the generated amounts of various aberrations are increased, with the result that it becomes difficult to obtain the high optical performance. It is more preferred to set the numerical value ranges of the conditional expressions (12) and (13) as follows.

$$0.25<|f1/f2|<0.65 \tag{12a}$$

$$1.05<|m2/f2|<3.50 \tag{13a}$$

It is still more preferred to set the numerical value ranges of the conditional expressions (12a) and (13a) as follows.

$$0.29<|f1/f2|<0.57 \tag{12b}$$

$$1.15<|m2/f2|<2.60 \tag{13b}$$

With the above-mentioned configuration, there can be obtained the zoom lens, which is small as the entire system, and has the bright F-number, the high zoom ratio, and the high optical performance. It is further preferred to satisfy one or more of conditional expressions provided below.

A focal length of the entire system of the zoom lens at the shortest focal length is represented by fw. A focal length of the entire system of the zoom lens at the longest focal length is represented by ft. A total lens length at the shortest focal length is represented by TLw. The term "total lens length" as used herein refers to a value obtained by adding a value of an air-equivalent back focus to a distance from the first lens surface to the last lens surface. The back focus is an air-equivalent distance from the last lens surface to the image plane excluding a glass block. A total lens length at the longest focal length is represented by TLt.

Curvature radii of lens surfaces on the object side and the image side of the first negative lens are represented by R1a and R1b, respectively. Curvature radii of lens surfaces on the object side and the image side of the second negative lens are represented by R2a and R2b, respectively. It is preferred that the first lens unit L1 have three negative lenses successively arranged closest to the object side and in order toward the image side, and at this time, focal lengths of the three negative lenses are represented by fG1, fG2, and fG3 in the stated order from the object side to the image side, respectively.

At this time, it is preferred to satisfy one or more of the following conditional expressions.

$$1.0<|f1/fw|<5.0 \tag{14}$$

$$0.4<f2/ft<3.0 \tag{15}$$

$$0.01<fw/TLw<0.05 \tag{16}$$

$$0.03<|f1/TLw|<0.12 \tag{17}$$

$$0.05<ft/TLt<0.30 \tag{18}$$

$$0.1<f2/TLt<0.3 \tag{19}$$

$$1.0<(R1a+R1b)/(R1a-R1b)<4.5 \tag{6}$$

$$0.5<(R2a+R2b)/(R2a-R2b)<3.5 \tag{7}$$

$$0.8<fG1/fG2<4.0 \tag{8}$$

$$0.3<fG2/fG3<1.5 \tag{9}$$

Next, technical meanings of the above-mentioned conditional expressions (14) to (19) are described. Technical meanings of the conditional expressions (6) to (9) are similar to the above description, and hence a description thereof is omitted. The conditional expression (14) defines a ratio of the focal length f1 of the first lens unit L1 having the negative refractive power to the focal length fw of the entire system at the shortest focal length. When the ratio falls below the lower limit value of the conditional expression (14), and the negative refractive power of the first lens unit L1 becomes stronger, the generated amounts of various aberrations are increased, and it becomes difficult to obtain the high optical performance. When the ratio exceeds the upper limit value of the conditional expression (14), and the negative refractive power of the first lens unit L1 becomes weaker, a movement amount of the first lens unit L1 during zooming becomes much larger, and it becomes difficult to downsize the entire system.

The conditional expression (15) defines a ratio of the focal length f2 of the second lens unit L2 having the positive refractive power to the focal length ft of the entire system at the longest focal length. When the ratio falls below the lower limit value of the conditional expression (15), and the positive refractive power of the second lens unit L2 becomes stronger, the generated amounts of various aberrations are increased, and it becomes difficult to obtain the high optical performance. When the ratio exceeds the upper limit value of the conditional expression (15), and the positive refractive power of the second lens unit L2 becomes weaker, the movement amount of the second lens unit L2 during zooming becomes much larger, and it becomes difficult to downsize the entire system.

The conditional expression (16) defines a ratio of the focal length fw of the entire system at the shortest focal length to the total lens length TLw at the shortest focal length. When the ratio falls below the lower limit value of the conditional expression (16), and the total lens length TLw becomes longer, it becomes difficult to downsize the entire system at the shortest focal length. When the ratio exceeds the upper limit value of the conditional expression (16), and the focal length of the entire system at the shortest focal length becomes much longer, it becomes difficult to sufficiently increase the angle of field at the shortest focal length.

The conditional expression (17) defines a ratio of the focal length f1 of the first lens unit to the total lens length TLw at the shortest focal length. When the ratio falls below the lower limit value of the conditional expression (17), and the total lens length TLw becomes longer, it becomes difficult to downsize the entire system at the shortest focal length. When the ratio exceeds the upper limit value of the conditional expression (17), and the negative refractive power of the first lens unit L1 becomes weaker, the movement amount of the first lens unit L1 during zooming is increased, and it becomes difficult to downsize the entire system.

The conditional expression (18) defines a ratio of the focal length ft of the entire system at the longest focal length to the total lens length TLt at the longest focal length. When the ratio falls below the lower limit value of the conditional expression (18), and the total lens length TLt becomes longer, it becomes difficult to downsize the entire system at the longest focal length. When the ratio exceeds the upper limit value of the conditional expression (18), and the focal length of the entire system at the longest focal length becomes longer, it becomes difficult to maintain the high optical performance over the entire zoom range.

The conditional expression (19) defines a ratio of the focal length f2 of the second lens unit L2 to the total lens length TLt at the longest focal length. When the ratio falls below the lower limit value of the conditional expression (19), and the total lens length TLt becomes longer, it becomes difficult to downsize the entire system at the longest focal length. When the ratio exceeds the upper limit value of the conditional expression (19), and the positive refractive power of the second lens unit L2 becomes weaker, the movement amount of the second lens unit L2 during zooming is increased, and it becomes difficult to downsize the entire system.

In the zoom lens according to the present invention, the half angle of field of 80 degrees or more at the shortest focal length is attained, and the angle of incidence of the light beam on the first lens unit L1 with respect to the optical axis is large. Therefore, there is a need to bend (refract) the incident light beam at the large angle in the first lens unit L1. Meanwhile, when the light beam is bent too abruptly, various aberrations regarding the peripheral image height, such as the distortion and the field curvature in particular, are increased, and hence it becomes important to appropriately set the lens configuration, the lens shapes, the power arrangement, and other such factors in the first lens unit L1.

In the zoom lens according to the present invention, in order to bend the incident light beam at the large angle while maintaining the high optical performance, the first lens unit L1 includes two negative lenses, which are arranged successively in order from the object side to the image side, and each of which has the meniscus shape with the convex surface thereof facing the object side. It is more preferred to arrange another negative lens on the image side of the two negative lenses.

In the zoom lens according to the present invention, it is further preferred to set the numerical value ranges of the conditional expressions (14) to (19) and the conditional expressions (6) to (9) as follows.

$$1.5 < |f1/fw| < 4.5 \quad (14a)$$

$$0.5 < f2/ft < 2.5 \quad (15a)$$

$$0.013 < fw/TLw < 0.040 \quad (16a)$$

$$0.04 < |f1/TLw| < 0.10 \quad (17a)$$

$$0.07 < ft/TLt < 0.27 \quad (18a)$$

$$0.13 < f2/TLt < 0.27 \quad (19a)$$

$$1.5 < (R1a+R1b)/(R1a-R1b) < 4.0 \quad (6a)$$

$$0.8 < (R2a+R2b)/(R2a-R2b) < 3.0 \quad (7a)$$

$$1.0 < fG1/fG2 < 3.5 \quad (8a)$$

$$0.4 < fG2/fG3 < 1.3 \quad (9a)$$

In addition, it is still further preferred to set the numerical value ranges of the conditional expressions (3a) to (12a) as follows.

$$2.0 < |f1/fw| < 4.1 \quad (14b)$$

$$0.7 < f2/ft < 2.1 \quad (15b)$$

$$0.015 < fw/TLw < 0.033 \quad (16b)$$

$$0.05 < |f1/TLw| < 0.09 \quad (17b)$$

$$0.09 < ft/TLt < 0.23 \quad (18b)$$

$$0.16 < f2/TLt < 0.23 \quad (19b)$$

$$1.8 < (R1a+R1b)/(R1a-R1b) < 3.1 \quad (6a)$$

$$1.3 < (R2a+R2b)/(R2a-R2b) < 2.3 \quad (7a)$$

$$1.3 < fG1/fG2 < 3.0 \quad (8b)$$

$$0.5 < fG2/fG3 < 1.1 \quad (9b)$$

In the zoom lens according to the present invention, it is preferred that the first lens unit L1 include three or more negative lenses and one or more positive lenses. There has been described that the first lens unit L1 includes the three or more negative lenses, and in order to correct an on-axial chromatic aberration and a lateral chromatic aberration, in particular, it is preferred that the first lens unit L1 also include the one or more positive lenses. In the zoom lens according to the present invention, it is more preferred that the lens unit Lmp, which is the main magnification-varying lens unit, include a lens having a lens surface having an aspherical shape, and a cemented lens obtained by cementing a positive lens and a negative lens.

The lens unit Lmp is required to bend divergent light, which enters from the first lens unit having the negative refractive power, at a large angle into convergent light, during which a large spherical aberration is generated, in particular. Therefore, in order to correct the spherical aberration, it is preferred that the lens unit Lmp include at least one lens having the aspherical shape. In order to correct the on-axial chromatic aberration and the lateral chromatic aberration, it is more preferred that the lens unit Lmp include the cemented lens obtained by cementing the positive lens and the negative lens.

Next, a lens configuration of the zoom lens according to each of Embodiments is described. The zoom lens according to each of Embodiments 1 to 7 consists, in order from the object side to the image side, of a first lens unit L1 having a negative refractive power, a second lens unit L2 having a positive refractive power, a third lens unit L3 having a negative refractive power, and a fourth lens unit L4 having a positive refractive power. During zooming, the lens units are configured to move so that an interval between each pair of adjacent lens units is changed. In this manner, varying magnification is shared among the lens units to reduce the total lens length and an effective diameter of a front lens while securing a sufficient magnification-varying ratio.

During zooming from the shortest focal length to the longest focal length, the first lens unit L1 is configured to move along a locus that is convex toward the image side, and the second lens unit L2 and the third lens unit L3 are configured to move toward the object side. The fourth lens unit L4 is configured not to move. The aperture stop SP is configured to move along the same locus as that of (integrally with) the third lens unit L3.

In each of Embodiments 1 to 7, a rear focus type in which focusing is performed by the third lens unit L3 is adopted. In the lens cross-sectional views, a solid line 3a and a dotted line 3b regarding the third lens unit L3 indicate the movement loci accompanying zooming from the shortest focal length to the longest focal length when focusing at infinity and close distance, respectively. Moreover, when focusing is performed from infinity to close distance at the longest focal length, the focusing is performed by retracting the third lens unit L3 toward the image side as indicated by an arrow 3c in the lens cross-sectional views.

The zoom lens according to Embodiment 8 consists, in order from the object side to the image side, of a first lens unit L1 having a negative refractive power, a second lens unit L2 having a positive refractive power, a third lens unit L3 having a positive refractive power, a fourth lens unit L4 having a negative refractive power, and a fifth lens unit L5 having a positive refractive power.

During zooming, an interval between each pair of adjacent lens units is changed. During zooming from the shortest focal length to the longest focal length, each of the first lens unit L1 and the second lens unit L2 is configured to move along a locus that is convex toward the image side, and the third lens unit L3 and the fourth lens unit L4 are configured to move toward the object side. The fifth lens unit L5 is configured not to move. In the lens cross-sectional views, a solid line 4a and a dotted line 4b regarding the fourth lens unit L4 indicate the movement loci accompanying zooming from the shortest focal length to the longest focal length when focusing at infinity and close distance, respectively. When focusing is performed from infinity to close distance at the longest focal length, the fourth lens unit L4 is configured to move toward the image side as indicated by an arrow 4c.

The zoom lens according to Embodiment 9 consists, in order from the object side to the image side, of a first lens unit L1 having a negative refractive power, a second lens unit L2 having a positive refractive power, and a third lens unit L3 having a positive refractive power. During zooming from the shortest focal length to the longest focal length, the lens units are configured to move as indicated by the arrows.

More specifically, during zooming from the shortest focal length to the longest focal length, the first lens unit L1 is configured to move along a locus that is convex toward the image side, and the second lens unit L2 is configured to move monotonously toward the object side. Further, the third lens unit L3 is configured to move toward the image side. The aperture stop SP is configured to move along the same locus with that of (integrally with) the second lens unit L2.

The arrow 3a regarding the third lens unit L3 indicates the movement locus during zooming from the shortest focal length to the longest focal length when focusing on an object at infinity. Similarly, the arrow 3b indicates the movement locus during zooming from the shortest focal length to the longest focal length when focusing on an object at a close distance. The arrow 3c regarding the third lens unit L3 indicates the movement direction during focusing from infinity to close distance. During focusing from infinity to close distance, the third lens unit L3 is configured to move toward the object side.

The zoom lens according to Embodiment 10 consists, in order from the object side to the image side, of a first lens unit L1 having a negative refractive power, a second lens unit L2 having a positive refractive power, and a third lens unit L3 having a negative refractive power. During zooming from the shortest focal length to the longest focal length, the lens units are configured to move as indicated by the arrows. More specifically, during zooming from the shortest focal length to the longest focal length, the first lens unit L1 is configured to move along a locus that is convex toward the image side, and the second lens unit L2 is configured to move monotonously toward the object side. Further, the third lens unit L3 is configured to move toward the object side. The aperture stop SP is configured to move along the same locus with that of (integrally with) the second lens unit L2.

An arrow 1a regarding the first lens unit L1 indicates the movement locus during zooming from the shortest focal length to the longest focal length when focusing on an object at infinity. Similarly, an arrow 1b indicates the movement locus during zooming from the shortest focal length to the longest focal length when focusing on an object at a close distance. An arrow 1c regarding the first lens unit L1 indicates the movement direction during focusing from infinity to close distance. During focusing from infinity to close distance, the first lens unit L1 is configured to move toward the object side.

In each of Embodiments, the first lens unit L1 includes the three or more negative lenses and the one or more positive lenses. Moreover, in each of Embodiments, the second lens unit L2 includes a positive lens with both lens surfaces thereof having aspherical shapes, which is arranged closest to the object side, and a cemented lens obtained by cementing a negative lens and a positive lens. In this manner, the high optical performance is obtained over the entire zoom range. In each of Embodiments, a design assuming the equi-solid angle projection type expressed as $Y=2f\times\sin(\omega/2)$ is adopted, but the projection types specific to the fisheye lens, such as the above-mentioned stereographical projection type, and other such projection types may be adopted.

As described above, according to the present invention, there can be obtained the zoom lens, which has the wide half angle of field of 80 degrees or more at the shortest focal length, is capable of capturing an enlarged image of the subject at an angle of field of about the standard angle of field at the longest focal length, is small as the entire system, and has the bright F-number, the zoom ratio, and the high optical performance.

FIG. 23 is a schematic diagram of a main part of a surveillance camera using the zoom lens according to the present invention. In FIG. 23, a surveillance camera main body 20, and an image pickup optical system 21 formed of the zoom lens described in any one of Embodiments 1 to 10 are illustrated. A solid-state image pickup element (photoelectric conversion element) 22 such as a CCD sensor or a CMOS sensor is included in the surveillance camera main body 20 to receive light of a subject image formed by the image pickup optical system 21.

Next, numerical value data sets respectively corresponding to Embodiments 1 to 10 of the present invention are shown. In each numerical value data set, the number of an optical surface from the object side is represented by i. A curvature radius of the i-th optical surface (i-th surface) is represented by ri, and an interval between the i-th surface and the (i+1)th surface is represented by di. A refractive index and an Abbe number of a material of an optical member between the i-th surface and the (i+1)th surface with respect to the d-line are represented by ndi and vdi, respectively. Moreover, two optical surfaces closest to the image side are those of a glass material of a face place or the like. The asterisk (*) suffixed to the surface number indicates that the lens surface has an aspherical shape.

In addition, an eccentricity is represented by K, aspherical coefficients are represented by A4, A6, A8, A10, and A12, and a displacement in the optical axis direction at a position of a height h from the optical axis with respect to a surface apex is represented by x. At this time, an aspherical shape is expressed by the following expression.

$$x = (h^2/R)/[1+[1-(1+K)(h/R)^2]^{1/2}] + A4h^4 + A6h^6 + A8h^8 + A10h^{10} + A12h^{12}$$

where R represents a curvature radius. Further, the expression of "E-Z" means "$\times 10^{-z}$".

In each of Embodiments, the back focus (BF) is a distance from a surface closest to the image side of a lens system excluding a glass block such as a parallel plate to the image plane, which is expressed as an air-equivalent length. The total lens length is a value obtained by adding the back focus (BF) to a distance from the frontmost lens surface to the last lens surface. An F-number is represented by Fno, and the half angle of field (ω) is a numerical value regarding an angle of field that may be captured taking a distortion amount into consideration. In addition, correspondences between the respective numerical value data sets and the above-mentioned conditional expressions are shown in Table 1.

[Embodiment 1]
Unit mm

Surface Data

| Surface number i | ri | di | ndi | vdi |
|---|---|---|---|---|
| 1 | 28.064 | 1.10 | 1.78800 | 47.4 |
| 2 | 11.648 | 4.71 | | |
| 3 | 38.228 | 0.75 | 1.78800 | 47.4 |
| 4 | 7.236 | 8.61 | | |
| 5 | -19.301 | 0.45 | 1.75500 | 52.3 |
| 6 | 18.322 | 0.15 | | |
| 7 | 16.294 | 1.66 | 1.95906 | 17.5 |
| 8 | 135.475 | (Variable) | | |
| 9 (Stop) | ∞ | 1.00 | | |
| 10* | 12.509 | 6.00 | 1.69350 | 53.2 |
| 11* | -43.880 | 2.24 | | |
| 12 | 36.329 | 0.40 | 1.84666 | 23.8 |
| 13 | 9.146 | 2.92 | 1.49700 | 81.5 |
| 14 | -16.179 | 0.15 | | |
| 15 | 819.957 | 1.10 | 1.49700 | 81.5 |
| 16 | -26.056 | (Variable) | | |
| 17 | -40.224 | 0.70 | 1.77250 | 49.6 |
| 18 | 184.665 | (Variable) | | |
| 19 | 15.913 | 2.04 | 1.49700 | 81.5 |
| 20 | -36.252 | 2.00 | | |
| 21 | ∞ | 2.00 | 1.51633 | 64.1 |
| 22 | ∞ | 1.50 | | |
| Image plane | ∞ | | | |

Aspherical surface data

Tenth surface

| K = -1.38286e-001 | A4 = -7.49796e-005 | A6 = -3.15768e-007 |
|---|---|---|
| A8 = 1.88748e-009 | A10 = 6.26009e-011 | |

Eleventh surface

| K = 0.00000e+000 | A4 = 1.22542e-004 | A6 = -5.62573e-007 |
|---|---|---|

Various data
Zoom ratio 5.00

| | Shortest | Intermediate | Longest |
|---|---|---|---|
| Focal length | 1.67 | 2.77 | 8.37 |
| F-number | 1.60 | 1.85 | 3.50 |
| Half angle of field (degree) | 95.22 | 94.96 | 27.52 |
| Image height | 2.40 | 4.00 | 4.00 |
| Total lens length | 68.02 | 58.97 | 63.93 |
| BF | 4.82 | 4.82 | 4.82 |
| d8 | 25.26 | 13.07 | 1.50 |
| d16 | 1.50 | 3.77 | 8.49 |
| d18 | 1.78 | 2.64 | 14.46 |

Zoom lens unit data

| Unit | First surface | Focal length |
|---|---|---|
| 1 | 1 | -4.81 |
| 2 | 9 | 11.92 |
| 3 | 17 | -42.70 |
| 4 | 19 | 22.54 |

[Embodiment 2]
Unit mm

Surface Data

| Surface number i | ri | di | ndi | vdi |
|---|---|---|---|---|
| 1 | 30.125 | 1.40 | 1.83481 | 42.7 |
| 2 | 12.072 | 6.25 | | |
| 3 | 30.258 | 0.80 | 1.83481 | 42.7 |
| 4 | 7.021 | 9.74 | | |
| 5 | -18.682 | 0.45 | 1.75500 | 52.3 |
| 6 | 17.046 | 0.15 | | |
| 7 | 15.215 | 2.94 | 1.95906 | 17.5 |
| 8 | 140.545 | (Variable) | | |
| 9 (Stop) | ∞ | 1.00 | | |
| 10* | 12.429 | 5.87 | 1.69350 | 53.2 |

[Embodiment 2]
Unit mm

| | | | | |
|---|---|---|---|---|
| 11* | −32.047 | 2.37 | | |
| 12 | 50.275 | 0.40 | 1.84666 | 23.8 |
| 13 | 8.936 | 2.34 | 1.49700 | 81.5 |
| 14 | −22.072 | 0.15 | | |
| 15 | 51.822 | 1.14 | 1.49700 | 81.5 |
| 16 | −20.144 | (Variable) | | |
| 17 | −53.135 | 0.70 | 1.77250 | 49.6 |
| 18 | 115.735 | (Variable) | | |
| 19 | 30.306 | 1.71 | 1.49700 | 81.5 |
| 20 | −23.347 | 2.00 | | |
| 21 | ∞ | 2.00 | 1.51633 | 64.1 |
| 22 | ∞ | 1.50 | | |
| Image plane | ∞ | | | |

Aspherical surface data

Tenth surface

K = −1.79267e−001  A4 = −9.00830e−005  A6 = −9.80669e−007
A8 = 2.98779e−008  A10 = −7.83349e−010

Eleventh surface

K = 0.00000e+000  A4 = 1.22119e−004  A6 = −1.43231e−006

Various data
Zoom ratio 4.00

| | Shortest | Intermediate | Longest |
|---|---|---|---|
| Focal length | 1.50 | 2.46 | 5.98 |
| F-number | 1.60 | 1.97 | 3.50 |
| Half angle of field (degree) | 111.01 | 109.93 | 38.72 |
| Image height | 2.40 | 4.00 | 4.00 |
| Total lens length | 70.06 | 60.49 | 61.02 |
| BF | 4.82 | 4.82 | 4.82 |
| d8 | 24.13 | 11.82 | 1.50 |
| d16 | 1.50 | 3.62 | 5.78 |
| d18 | 1.53 | 2.14 | 10.84 |

Zoom lens unit data

| Unit | First surface | Focal length |
|---|---|---|
| 1 | 1 | −4.39 |
| 2 | 9 | 11.41 |
| 3 | 17 | −47.06 |
| 4 | 19 | 26.82 |

[Embodiment 3]
Unit mm

Surface Data

| Surface number i | ri | di | ndi | νdi |
|---|---|---|---|---|
| 1 | 22.154 | 1.00 | 1.77250 | 49.6 |
| 2 | 11.089 | 3.12 | | |
| 3 | 25.416 | 0.70 | 1.77250 | 49.6 |
| 4 | 6.505 | 8.22 | | |
| 5 | −15.443 | 0.40 | 1.72916 | 54.7 |
| 6 | 17.588 | 0.15 | | |
| 7 | 15.031 | 1.41 | 1.95906 | 17.5 |
| 8 | 74.562 | (Variable) | | |
| 9 (Stop) | ∞ | 1.00 | | |
| 10* | 11.626 | 5.81 | 1.69350 | 53.2 |
| 11* | −34.115 | 1.57 | | |
| 12 | 49.436 | 0.40 | 1.84666 | 23.8 |
| 13 | 9.584 | 2.49 | 1.49700 | 81.5 |
| 14 | −13.770 | 0.15 | | |
| 15 | −269.774 | 1.08 | 1.49700 | 81.5 |
| 16 | −17.814 | (Variable) | | |
| 17 | −48.004 | 0.70 | 1.77250 | 49.6 |
| 18 | 53.579 | (Variable) | | |
| 19 | 16.426 | 1.95 | 1.49700 | 81.5 |
| 20 | −29.481 | 2.00 | | |
| 21 | ∞ | 2.00 | 1.51633 | 64.1 |
| 22 | ∞ | 1.50 | | |
| Image plane | ∞ | | | |

Aspherical surface data

Tenth surface

K = −6.03930e−001  A4 = −6.92722e−005  A6 = −1.14491e−006
A8 = 6.40109e−008  A10 = −1.62662e−009

Eleventh surface

K = 0.00000e+000  A4 = 2.14069e−004  A6 = −1.41998e−006

Various data
Zoom ratio 4.00

| | Shortest | Intermediate | Longest |
|---|---|---|---|
| Focal length | 1.88 | 3.09 | 7.50 |
| F-number | 1.60 | 1.99 | 3.50 |
| Half angle of field (degree) | 81.05 | 80.99 | 30.71 |
| Image height | 2.40 | 4.00 | 4.00 |
| Total lens length | 58.02 | 51.38 | 54.52 |
| BF | 4.82 | 4.82 | 4.82 |
| d8 | 19.35 | 9.68 | 1.50 |
| d16 | 1.50 | 3.51 | 7.12 |
| d18 | 1.53 | 2.55 | 10.27 |

Zoom lens unit data

| Unit | First surface | Focal length |
|---|---|---|
| 1 | 1 | −4.78 |
| 2 | 9 | 10.44 |
| 3 | 17 | −32.68 |
| 4 | 19 | 21.53 |

[Embodiment 4]
Unit mm

Surface Data

| Surface number i | ri | di | ndi | νdi |
|---|---|---|---|---|
| 1 | 38.178 | 1.60 | 1.78800 | 47.4 |
| 2 | 14.433 | 7.41 | | |
| 3 | 37.220 | 1.00 | 1.78800 | 47.4 |
| 4 | 8.622 | 11.38 | | |
| 5 | −21.875 | 0.55 | 1.75500 | 52.3 |
| 6 | 21.735 | 0.18 | | |
| 7 | 19.640 | 1.90 | 1.95906 | 17.5 |
| 8 | 163.886 | (Variable) | | |
| 9 (Stop) | ∞ | 1.00 | | |
| 10* | 11.916 | 6.00 | 1.69350 | 53.2 |
| 11* | −422.860 | 2.22 | | |
| 12 | 24.068 | 0.40 | 1.84666 | 23.8 |
| 13 | 8.682 | 3.45 | 1.49700 | 81.5 |
| 14 | −16.004 | 0.15 | | |
| 15 | 374.184 | 1.04 | 1.49700 | 81.5 |
| 16 | −78.545 | (Variable) | | |
| 17 | −90.808 | 0.70 | 1.77250 | 49.6 |
| 18 | 30.576 | (Variable) | | |
| 19 | 16.079 | 2.08 | 1.49700 | 81.5 |
| 20 | −33.506 | 2.00 | | |
| 21 | ∞ | 2.00 | 1.51633 | 64.1 |
| 22 | ∞ | 1.50 | | |
| Image plane | ∞ | | | |

[Embodiment 4]
Unit mm

Aspherical surface data

Tenth surface

K = 7.32309e−003    A4 = −2.52328e−005    A6 = 2.49313e−007
A8 = −3.36977e−010    A10 = −5.62066e−012

Eleventh surface

K = 0.00000e+000    A4 = 1.64347e−004    A6 = 6.47698e−007

Various data
Zoom ratio 8.00

|  | Shortest | Intermediate | Longest |
|---|---|---|---|
| Focal length | 1.54 | 2.55 | 12.30 |
| F-number | 1.60 | 1.83 | 4.50 |
| Half angle of field (degree) | 107.09 | 104.97 | 18.63 |
| Image height | 2.40 | 4.00 | 4.00 |
| Total lens length | 89.37 | 74.59 | 80.99 |
| BF | 4.82 | 4.82 | 4.82 |
| d8 | 39.01 | 21.44 | 1.50 |
| d16 | 1.50 | 3.20 | 10.12 |
| d18 | 2.30 | 3.38 | 22.81 |

Zoom lens unit data

| Unit | First surface | Focal length |
|---|---|---|
| 1 | 1 | −5.39 |
| 2 | 9 | 13.11 |
| 3 | 17 | −29.54 |
| 4 | 19 | 22.17 |

[Embodiment 5]
Unit mm

Surface Data

| Surface number i | ri | di | ndi | vdi |
|---|---|---|---|---|
| 1 | 39.696 | 1.30 | 1.77250 | 49.6 |
| 2 | 13.243 | 4.05 | | |
| 3 | 24.861 | 0.90 | 1.77250 | 49.6 |
| 4 | 9.367 | 8.71 | | |
| 5 | −24.039 | 0.65 | 1.69680 | 55.5 |
| 6 | 30.885 | 0.15 | | |
| 7 | 21.828 | 1.94 | 1.95906 | 17.5 |
| 8 | 80.313 | (Variable) | | |
| 9 (Stop) | ∞ | 1.00 | | |
| 10* | 10.840 | 5.97 | 1.69350 | 53.2 |
| 11* | 23.629 | 2.02 | | |
| 12 | 22.054 | 0.40 | 1.85478 | 24.8 |
| 13 | 9.602 | 4.23 | 1.49700 | 81.5 |
| 14 | −14.229 | 0.15 | | |
| 15 | 14.108 | 1.54 | 1.49700 | 81.5 |
| 16 | 48.947 | (Variable) | | |
| 17 | −92.066 | 0.70 | 1.69680 | 55.5 |
| 18 | 14.722 | (Variable) | | |
| 19 | 12.665 | 2.57 | 1.49700 | 81.5 |
| 20 | −46.851 | 2.00 | | |
| 21 | ∞ | 2.00 | 1.51633 | 64.1 |
| 22 | ∞ | 1.50 | | |
| Image plane | ∞ | | | |

Aspherical surface data

Tenth surface

K = 2.01725e−002    A4 = −1.22434e−005    A6 = 1.06289e−007
A8 = −8.40518e−009    A10 = 7.12164e−011

Eleventh surface

K = 0.00000e+000    A4 = 2.05184e−004    A6 = 9.17735e−007

Various data
Zoom ratio 10.00

|  | Shortest | Intermediate | Longest |
|---|---|---|---|
| Focal length | 1.84 | 3.07 | 18.37 |
| F-number | 1.60 | 1.84 | 4.90 |
| Half angle of field (degree) | 82.00 | 80.99 | 12.44 |
| Image height | 2.40 | 4.00 | 4.00 |
| Total lens length | 95.02 | 76.59 | 80.56 |
| BF | 4.82 | 4.82 | 4.82 |
| d8 | 49.61 | 28.26 | 1.50 |
| d16 | 1.50 | 2.38 | 8.32 |
| d18 | 2.12 | 4.17 | 28.95 |

Zoom lens unit data

| Unit | First surface | Focal length |
|---|---|---|
| 1 | 1 | −7.39 |
| 2 | 9 | 13.03 |
| 3 | 17 | −18.17 |
| 4 | 19 | 20.35 |

[Embodiment 6]
Unit mm

Surface Data

| Surface number i | ri | di | ndi | vdi |
|---|---|---|---|---|
| 1 | 31.302 | 1.30 | 1.78800 | 47.4 |
| 2 | 12.687 | 5.24 | | |
| 3 | 35.463 | 0.90 | 1.78800 | 47.4 |
| 4 | 7.891 | 9.33 | | |
| 5 | −18.952 | 0.55 | 1.75500 | 52.3 |
| 6 | 23.066 | 0.15 | | |
| 7 | 19.962 | 1.75 | 1.95906 | 17.5 |
| 8 | 455.674 | (Variable) | | |
| 9 (Stop) | ∞ | 1.00 | | |
| 10* | 14.477 | 5.55 | 1.69350 | 53.2 |
| 11* | −45.648 | 3.22 | | |
| 12 | 46.602 | 0.45 | 1.84666 | 23.8 |
| 13 | 10.603 | 3.14 | 1.49700 | 81.5 |
| 14 | −18.163 | 0.15 | | |
| 15 | 247.748 | 1.21 | 1.49700 | 81.5 |
| 16 | −28.226 | (Variable) | | |
| 17 | −51.679 | 0.80 | 1.77250 | 49.6 |
| 18 | 95.706 | (Variable) | | |
| 19 | 15.297 | 2.66 | 1.49700 | 81.5 |
| 20 | −38.203 | 2.00 | | |
| 21 | ∞ | 2.00 | 1.51633 | 64.1 |
| 22 | ∞ | 1.50 | | |
| Image plane | ∞ | | | |

Aspherical surface data

Tenth surface

K = 1.98402e−001    A4 = −5.14881e−005    A6 = 8.07605e−009
A8 = 1.00915e−009    A10 = −6.08754e−012

Eleventh surface

K = 0.00000e+000    A4 = 9.74683e−005    A6 = −2.01144e−009

-continued

[Embodiment 6]
Unit mm

Various data
Zoom ratio 5.00

| | Shortest | Intermediate | Longest |
|---|---|---|---|
| Focal length | 1.94 | 2.74 | 9.71 |
| F-number | 1.60 | 1.76 | 3.50 |
| Half angle of field (degree) | 95.84 | 94.98 | 23.68 |
| Image height | 2.83 | 4.00 | 4.00 |
| Total lens length | 75.03 | 67.54 | 71.05 |
| BF | 4.82 | 4.82 | 4.82 |
| d8 | 27.47 | 17.71 | 1.50 |
| d16 | 1.50 | 3.27 | 12.22 |
| d18 | 3.16 | 3.67 | 14.43 |

Zoom lens unit data

| Unit | First surface | Focal length |
|---|---|---|
| 1 | 1 | −5.34 |
| 2 | 9 | 13.32 |
| 3 | 17 | −43.34 |
| 4 | 19 | 22.35 |

[Embodiment 7]
Unit mm

Surface Data

| Surface number i | ri | di | ndi | νdi |
|---|---|---|---|---|
| 1 | 24.396 | 1.10 | 1.77250 | 49.6 |
| 2 | 11.101 | 4.55 | | |
| 3 | 41.771 | 0.75 | 1.77250 | 49.6 |
| 4 | 6.372 | 7.37 | | |
| 5 | −20.443 | 0.45 | 1.69680 | 55.5 |
| 6 | 10.652 | 0.15 | | |
| 7 | 10.135 | 3.17 | 1.95906 | 17.5 |
| 8 | 29.037 | (Variable) | | |
| 9 (Stop) | ∞ | 1.00 | | |
| 10* | 15.418 | 5.98 | 1.69350 | 53.2 |
| 11* | −257.173 | 1.62 | | |
| 12 | 34.506 | 0.40 | 1.84666 | 23.8 |
| 13 | 10.648 | 2.25 | 1.49700 | 81.5 |
| 14 | −16.962 | 0.15 | | |
| 15 | 68.193 | 1.24 | 1.49700 | 81.5 |
| 16 | −14.000 | (Variable) | | |
| 17 | −37.064 | 0.70 | 1.77250 | 49.6 |
| 18 | −93.359 | (Variable) | | |
| 19 | 12.012 | 2.17 | 1.49700 | 81.5 |
| 20 | −76.369 | 2.00 | | |
| 21 | ∞ | 2.00 | 1.51633 | 64.1 |
| 22 | ∞ | 1.49 | | |
| Image plane | ∞ | | | |

Aspherical surface data

Tenth surface

K = −4.36427e−001  A4 = −1.60904e−004  A6 = −1.70189e−006
A8 = 1.03080e−008  A10 = −2.33625e−009

Eleventh surface

K = 0.00000e+000  A4 = 6.18458e−005  A6 = −2.28778e−006

Various data
Zoom ratio 5.00

| | Shortest | Intermediate | Longest |
|---|---|---|---|
| Focal length | 1.10 | 2.82 | 5.51 |
| F-number | 1.60 | 2.30 | 3.50 |

-continued

[Embodiment 7]
Unit mm

| | | | |
|---|---|---|---|
| Half angle of field (degree) | 94.90 | 94.97 | 42.60 |
| Image height | 1.57 | 4.00 | 4.00 |
| Total lens length | 69.03 | 55.03 | 59.61 |
| BF | 4.81 | 4.81 | 4.81 |
| d8 | 27.47 | 7.31 | 1.50 |
| d16 | 1.50 | 5.97 | 7.08 |
| d18 | 1.52 | 3.21 | 12.49 |

Zoom lens unit data

| Unit | First surface | Focal length |
|---|---|---|
| 1 | 1 | −4.04 |
| 2 | 9 | 11.28 |
| 3 | 17 | −80.00 |
| 4 | 19 | 21.06 |

[Embodiment 8]
Unit mm

Surface Data

| Surface number i | ri | di | ndi | νdi |
|---|---|---|---|---|
| 1 | 28.936 | 1.10 | 1.78800 | 47.4 |
| 2 | 11.680 | 4.46 | | |
| 3 | 34.847 | 0.75 | 1.78800 | 47.4 |
| 4 | 7.299 | 8.22 | | |
| 5 | −21.543 | 0.45 | 1.75500 | 52.3 |
| 6 | 28.560 | (Variable) | | |
| 7 | 27.485 | 0.45 | 1.49700 | 81.5 |
| 8 | 14.534 | 1.60 | 1.95906 | 17.5 |
| 9 | 49.301 | (Variable) | | |
| 10 (Stop) | ∞ | 1.00 | | |
| 11* | 12.493 | 6.00 | 1.69350 | 53.2 |
| 12* | −40.391 | 2.30 | | |
| 13 | 39.190 | 0.40 | 1.84666 | 23.8 |
| 14 | 9.077 | 2.96 | 1.49700 | 81.5 |
| 15 | −14.975 | 0.15 | | |
| 16 | 440.811 | 1.05 | 1.49700 | 81.5 |
| 17 | −32.689 | (Variable) | | |
| 18 | −29.587 | 0.70 | 1.77250 | 49.6 |
| 19 | −305.083 | (Variable) | | |
| 20 | 14.495 | 2.09 | 1.49700 | 81.5 |
| 21 | −38.318 | 2.00 | | |
| 22 | ∞ | 2.00 | 1.51633 | 64.1 |
| 23 | ∞ | 1.50 | | |
| Image plane | ∞ | | | |

Aspherical surface data

Eleventh surface

K = −2.35887e−001  A4 = −7.55418e−005  A6 = −3.32982e−007
A8 = 8.59163e−009  A10 = −1.45109e−010

Twelfth surface

K = 0.00000e+000  A4 = 1.12583e−004  A6 = −6.22943e−007

Various data
Zoom ratio 4.99

| | Shortest | Intermediate | Longest |
|---|---|---|---|
| Focal length | 1.67 | 2.76 | 8.32 |
| F-number | 1.60 | 1.86 | 3.50 |
| Half angle of field (degree) | 95.11 | 94.95 | 27.71 |
| Image height | 2.40 | 4.00 | 4.00 |
| Total lens length | 68.09 | 59.18 | 64.78 |
| BF | 4.82 | 4.82 | 4.82 |
| d6 | 0.50 | 0.56 | 0.62 |

-continued

[Embodiment 8]
Unit mm

| | | | |
|---|---|---|---|
| d9 | 25.26 | 13.04 | 1.50 |
| d17 | 1.50 | 3.63 | 7.59 |
| d19 | 1.66 | 2.76 | 15.90 |

Zoom lens unit data

| Unit | First surface | Focal length |
|---|---|---|
| 1 | 1 | −3.55 |
| 2 | 7 | 32.11 |
| 3 | 10 | 12.00 |
| 4 | 18 | −42.46 |
| 5 | 20 | 21.44 |

[Embodiment 9]
Unit mm

Surface Data

| Surface number i | ri | di | ndi | νdi |
|---|---|---|---|---|
| 1 | 27.555 | 1.10 | 1.78800 | 47.4 |
| 2 | 11.384 | 4.43 | | |
| 3 | 30.855 | 0.75 | 1.78800 | 47.4 |
| 4 | 6.896 | 6.97 | | |
| 5 | −24.295 | 0.45 | 1.75500 | 52.3 |
| 6 | 14.538 | 0.14 | | |
| 7 | 12.958 | 1.77 | 1.95906 | 17.5 |
| 8 | 48.972 | (Variable) | | |
| 9 (Stop) | ∞ | 1.00 | | |
| 10* | 12.525 | 4.76 | 1.69350 | 53.2 |
| 11* | 144.132 | 3.54 | | |
| 12 | 31.445 | 0.40 | 1.84666 | 23.8 |
| 13 | 9.982 | 2.68 | 1.49700 | 81.5 |
| 14 | −20.051 | 0.15 | | |
| 15 | 32.875 | 1.30 | 1.49700 | 81.5 |
| 16 | −30.642 | (Variable) | | |
| 17 | −29.109 | 0.70 | 1.77250 | 49.6 |
| 18 | −128.985 | 1.02 | | |
| 19 | 13.103 | 2.08 | 1.49700 | 81.5 |
| 20 | −41.284 | (Variable) | | |
| 21 | ∞ | 2.00 | 1.51633 | 64.1 |
| 22 | ∞ | 1.50 | | |
| Image plane | ∞ | | | |

Aspherical surface data

Tenth surface

K = −1.03170e−001  A4 = −3.48328e−005  A6 = −7.57643e−007
A8 = 2.53453e−008  A10 = −2.98498e−010

Eleventh surface

K = 0.00000e+000  A4 = 1.11596e−004  A6 = −2.20679e−007

Various data
Zoom ratio 4.99

| | Shortest | Intermediate | Longest |
|---|---|---|---|
| Focal length | 1.64 | 2.74 | 8.17 |
| F-number | 1.60 | 1.90 | 3.50 |
| Half angle of field (degree) | 95.00 | 94.94 | 28.42 |
| Image height | 2.40 | 4.00 | 4.00 |
| Total lens length | 68.12 | 59.37 | 63.68 |
| BF | 6.21 | 5.74 | 4.82 |
| d8 | 26.49 | 14.07 | 1.50 |
| d16 | 1.50 | 5.63 | 23.45 |
| d20 | 3.39 | 2.92 | 2.00 |

-continued

[Embodiment 9]
Unit mm

Zoom lens unit data

| Unit | First surface | Focal length |
|---|---|---|
| 1 | 1 | −4.90 |
| 2 | 9 | 13.00 |
| 3 | 17 | 32.53 |

[Embodiment 10]
Unit mm

Surface Data

| Surface number i | ri | di | ndi | νdi |
|---|---|---|---|---|
| 1 | 33.691 | 1.30 | 1.80400 | 46.6 |
| 2 | 10.001 | 4.91 | | |
| 3 | 44.432 | 0.80 | 1.78800 | 47.4 |
| 4 | 7.981 | 3.64 | | |
| 5 | −432.818 | 0.50 | 1.75500 | 52.3 |
| 6 | 14.102 | 1.26 | | |
| 7 | 14.377 | 2.36 | 1.95906 | 17.5 |
| 8 | 38.724 | (Variable) | | |
| 9 (Stop) | ∞ | 1.00 | | |
| 10* | 9.716 | 2.98 | 1.55332 | 71.7 |
| 11* | −33.063 | 2.59 | | |
| 12 | 34.349 | 1.53 | 1.49700 | 81.5 |
| 13 | −16.775 | 0.40 | 1.88300 | 40.8 |
| 14 | 42.341 | 0.13 | | |
| 15 | 11.276 | 1.61 | 1.49700 | 81.5 |
| 16 | −30.055 | 0.40 | 1.91082 | 35.3 |
| 17 | 11.924 | 0.25 | | |
| 18 | 12.868 | 1.89 | 1.69680 | 55.5 |
| 19 | −12.785 | (Variable) | | |
| 20* | 42.920 | 0.80 | 1.85135 | 40.1 |
| 21* | 35.080 | (Variable) | | |
| 22 | ∞ | 2.00 | 1.51633 | 64.1 |
| 23 | ∞ | 1.50 | | |
| Image plane | ∞ | | | |

Aspherical surface data

Tenth surface

K = −8.83459e−002  A4 = −1.14811e−004  A6 = 5.57176e−007
A8 = 2.19466e−009

Eleventh surface

K = 2.36941e+000  A4 = 6.74315e−005  A6 = 1.67148e−006
A8 = −1.66281e−009

Twentieth surface

K = 0.00000e+000  A4 = −1.30255e−003  A6 = −1.07107e−006
A8 = −1.06843e−006  A10 = 1.84286e−008  A12 = 2.99759e−009

Twenty-first surface

K = 0.00000e+000  A4 = −1.09110e−003  A6 = 5.67614e−006
A8 = −1.31367e−006  A10 = 5.79101e−008  A12 = 2.23959e−009

Various data
Zoom ratio 5.00

| | Shortest | Intermediate | Longest |
|---|---|---|---|
| Focal length | 1.71 | 2.77 | 8.56 |
| F-number | 1.60 | 1.89 | 3.50 |
| Half angle of field (degree) | 89.74 | 90.21 | 26.73 |
| Image height | 2.40 | 4.00 | 4.00 |
| Total lens length | 70.01 | 57.03 | 52.22 |
| BF | 6.21 | 8.44 | 20.10 |
| d8 | 33.11 | 17.98 | 1.47 |
| d19 | 1.67 | 1.59 | 1.63 |
| d21 | 3.39 | 5.62 | 17.28 |

-continued

[Embodiment 10]
Unit mm

Zoom lens unit data

| Unit | First Surface | Focal length |
|---|---|---|
| 1 | 1 | −5.79 |
| 2 | 9 | 11.67 |
| 3 | 20 | −236.70 |

TABLE 1

| Conditional Expression | Embodiment | | | | | | | | | |
|---|---|---|---|---|---|---|---|---|---|---|
| | 1 | 2 | 3 | 4 | 5 | 6 | 7 | 8 | 9 | 10 |
| (1) | 0.917 | 0.834 | 0.897 | 0.965 | 0.987 | 0.939 | 0.790 | 0.916 | 0.905 | 0.928 |
| (2) | 1.667 | 1.667 | 1.667 | 1.667 | 1.667 | 1.413 | 2.548 | 1.667 | 1.667 | 1.667 |
| (3) | 0.997 | 0.990 | 0.999 | 0.980 | 0.988 | 0.991 | 1.001 | 0.998 | 0.999 | 1.005 |
| (4) | 95.22° | 111.01° | 81.05° | 107.09° | 82.00° | 95.84° | 94.90° | 95.11° | 95.00° | 89.74° |
| (5) | 1.650 | 1.191 | 1.375 | 2.223 | 2.583 | 1.650 | 1.467 | 1.693 | 1.581 | 1.187 |
| (6) | 2.419 | 2.337 | 3.004 | 2.216 | 2.001 | 2.363 | 2.670 | 2.354 | 2.408 | 1.844 |
| (7) | 1.467 | 1.604 | 1.688 | 1.603 | 2.209 | 1.572 | 1.360 | 1.530 | 1.576 | 1.438 |
| (8) | 2.274 | 2.248 | 2.601 | 2.099 | 1.317 | 2.137 | 2.785 | 2.157 | 2.221 | 1.455 |
| (9) | 0.924 | 0.948 | 1.025 | 1.007 | 1.034 | 0.954 | 0.983 | 0.732 | 0.953 | 0.690 |
| (10) | 0.404 | 0.384 | 0.458 | 0.411 | 0.567 | 0.401 | 0.358 | 0.296 | 0.377 | 0.496 |
| (11) | 1.424 | 1.907 | 1.391 | 1.066 | 0.709 | 1.372 | 2.049 | 1.443 | 1.592 | 1.363 |
| (12) | 0.404 | 0.384 | 0.458 | 0.411 | 0.567 | 0.401 | 0.358 | — | 0.377 | 0.496 |
| (13) | 1.650 | 1.191 | 1.375 | 2.223 | 2.583 | 1.650 | 1.467 | — | 1.581 | 1.187 |
| (14) | 2.872 | 2.928 | 2.549 | 3.505 | 4.023 | 2.747 | 3.670 | — | 2.990 | 3.380 |
| (15) | 1.424 | 1.907 | 1.391 | 1.066 | 0.709 | 1.372 | 2.049 | — | 1.592 | 1.363 |
| (16) | 0.0246 | 0.0214 | 0.0324 | 0.0172 | 0.0193 | 0.0259 | 0.0160 | — | 0.0240 | 0.0245 |
| (17) | 0.0707 | 0.0626 | 0.0825 | 0.0603 | 0.0778 | 0.0712 | 0.0586 | — | 0.0719 | 0.0826 |
| (18) | 0.131 | 0.098 | 0.138 | 0.152 | 0.228 | 0.137 | 0.092 | — | 0.128 | 0.164 |
| (19) | 0.186 | 0.187 | 0.192 | 0.162 | 0.162 | 0.188 | 0.189 | — | 0.204 | 0.223 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-114801, filed Jun. 5, 2015, and Japanese Patent Application No. 2015-114802, filed Jun. 5, 2015, which are hereby incorporated by reference herein in their entirety.

What is claimed is:

1. A zoom lens, which is configured to form a subject image on an image pickup element, comprising, in order from an object side to an image side:
   a first lens unit having a negative refractive power; and
   a rear group including a plurality of lens units,
   wherein the rear group comprises a lens unit having a positive refractive power,
   wherein an interval between each pair of adjacent lens units is changed during zooming from a shortest focal length to a longest focal length,
   wherein the image pickup element has a rectangular image pickup region, and when a focal length of the zoom lens is the shortest focal length, a maximum image height is lower than a half of a diagonal length of the rectangular image pickup region, and there are regions in which the subject image is not formed in the image pickup region,
   wherein, when a focal length of the zoom lens at which the maximum image height becomes a half of the diagonal length of the image pickup region is defined as an intermediate focal length, the maximum image height is increased during zooming from the shortest focal length to the intermediate focal length, and
   wherein the following conditional expressions are satisfied:

$$0.75 < D/(ft \times \tan(\omega t)) < 1.10; \text{ and}$$

$$1.4 < D/Yw < 2.6,$$

where $ft$ represents a focal length of the zoom lens at the longest focal length, $\omega t$ represents a half angle of field of the zoom lens at the longest focal length, $Yw$ represents an image height at the shortest focal length, and $D$ represents a length that is a half of the diagonal length of the image pickup element.

2. The zoom lens according to claim 1, wherein the following conditional expressions are satisfied:

$$0.9 < \omega m/\omega w < 1.1; \text{ and}$$

$$80° < \omega w < 115°,$$

where $\omega w$ represents a half angle of field of the zoom lens at the shortest focal length in degrees, and $\omega m$ represents a half angle of field of the zoom lens at the intermediate focal length in degrees.

3. The zoom lens according to claim 1, wherein the lens unit having the positive refractive power included in the rear group is configured to move monotonously toward the object side during zooming from the shortest focal length to the longest focal length, and to satisfy the following conditional expression:

$$1.0 < |mp/fp| < 4.0,$$

where $fp$ represents a focal length of the lens unit having the positive refractive power included in the rear group, and $mp$ represents a movement amount of the lens unit having the positive refractive power included in the rear group during zooming from the shortest focal length to the longest focal length.

4. The zoom lens according to claim 1, wherein the first lens unit comprises, in order from the object side to the image side, a first negative lens having a meniscus shape with a convex surface thereof facing the object side, and a second negative lens having a meniscus shape with a convex surface thereof facing the object side.

5. The zoom lens according to claim 4, wherein the following conditional expressions are satisfied:

$$1.0 < (R1a+R1b)/(R1a-R1b) < 4.5; \text{ and}$$

$$0.5 < (R2a+R2b)/(R2a-R2b) < 3.5,$$

where R1a and R1b represent curvature radii of lens surfaces on the object side and the image side of the first negative lens, respectively, and R2a and R2b represent curvature radii of lens surfaces on the object side and the image side of the second negative lens, respectively.

6. The zoom lens according to claim 1, wherein the first lens unit includes three negative lenses successively arranged closest to the object side and in order toward the image side, and satisfies the following conditional expressions:

$$0.8 < fG1/fG2 < 4.0; \text{ and}$$

$$0.3 < fG2/fG3 < 1.5,$$

where fG1, fG2, and fG3 represent focal lengths of the three negative lenses in order from the object side to the image side, respectively.

7. The zoom lens according to claim 1, wherein the following conditional expression is satisfied:

$$0.2 < |f1/fp| < 0.7,$$

where f1 represents a focal length of the first lens unit, and fp represents a focal length of the lens unit having the positive refractive power included in the rear group.

8. The zoom lens according to claim 1, wherein the following conditional expression is satisfied:

$$0.4 < |fp/ft| < 3.0,$$

where fp represents a focal length of the lens unit having the positive refractive power included in the rear group.

9. The zoom lens according to claim 1, wherein the lens unit having the positive refractive power included in the rear group includes a lens having a lens surface having an aspherical shape, and a cemented lens obtained by cementing a positive lens and a negative lens.

10. The zoom lens according to claim 1,
wherein the first lens unit is configured to move during zooming, and
wherein the rear group consists of a second lens unit having a positive refractive power, which is configured to move during zooming, a third lens unit having a negative refractive power, which is configured to move during zooming, and a fourth lens unit having a positive refractive power, the second lens unit, the third lens unit, and the fourth lens unit being arranged in the stated order from the object side to the image side.

11. The zoom lens according to claim 1,
wherein the first lens unit is configured to move during zooming, and
wherein the rear group consists of a second lens unit having a positive refractive power, which is configured to move during zooming, a third lens unit having a positive refractive power, which is configured to move during zooming, a fourth lens unit having a negative refractive power, which is configured to move during zooming, and a fifth lens unit having a positive refractive power, the second lens unit, the third lens unit, the fourth lens unit, and the fifth lens unit being arranged in the stated order from the object side to the image side.

12. The zoom lens according to claim 1,
wherein the first lens unit is configured to move during zooming, and
wherein the rear group consists of a second lens unit having a positive refractive power, which is configured to move during zooming, and a third lens unit having a positive refractive power, which is configured to move during zooming, the second lens unit and the third lens unit being arranged in the stated order from the object side to the image side.

13. The zoom lens according to claim 1,
wherein the first lens unit is configured to move during zooming, and
wherein the rear group consists of a second lens unit having a positive refractive power, which is configured to move during zooming, and a third lens unit having a negative refractive power, which is configured to move during zooming, the second lens unit and the third lens unit being arranged in the stated order from the object side to the image side.

14. An image pickup apparatus, comprising:
a zoom lens; and
an image pickup element configured to receive an image formed by the zoom lens,
the zoom lens comprising, in order from an object side to an image side:
a first lens unit having a negative refractive power; and
a rear group including a plurality of lens units,
wherein the rear group comprises a lens unit having a positive refractive power,
wherein an interval between each pair of adjacent lens units is changed during zooming from a shortest focal length to a longest focal length,
wherein the image pickup element has a rectangular image pickup region, and when a focal length of the zoom lens is the shortest focal length, a maximum image height is lower than a half of a diagonal length of the rectangular image pickup region, and there are regions in which the subject image is not formed in the image pickup region,
wherein, when a focal length of the zoom lens at which the maximum image height becomes a half of the diagonal length of the image pickup region is defined as an intermediate focal length, the maximum image height is increased during zooming from the shortest focal length to the intermediate focal length, and
wherein the following conditional expressions are satisfied:

$$0.75 < D/(ft \times \tan(\omega t)) < 1.10; \text{ and}$$

$$1.4 < D/Yw < 2.6,$$

where ft represents a focal length of the zoom lens at the longest focal length, ωt represents a half angle of field of the zoom lens at the longest focal length, Yw represents an image height at the shortest focal length, and D represents a length that is a half of the diagonal length of the image pickup element.

* * * * *